United States Patent [19]

Ohtake et al.

[11] Patent Number: 4,910,681

[45] Date of Patent: Mar. 20, 1990

[54] MULTI-FUNCTIONALITY TELEVISION TESTING SIGNAL GENERATOR USING DIGITAL SCHEME

[75] Inventors: Masatosi Ohtake; Takao Arai, both of Tokyo, Japan

[73] Assignee: Anritsu Corporation, Tokyo, Japan

[21] Appl. No.: 193,373

[22] Filed: May 12, 1988

[30] Foreign Application Priority Data

May 15, 1987 [JP] Japan ................. 62-118324

[51] Int. Cl.$^4$ ................. H04N 17/00; G06F 15/20
[52] U.S. Cl. ................. 364/514; 358/10; 358/31; 358/335; 358/160; 371/20.4
[58] Field of Search ................. 371/20; 364/514; 358/20, 31, 139, 335, 340, 10, 160, 280

[56] References Cited

U.S. PATENT DOCUMENTS

| | | | |
|---|---|---|---|
| 4,419,699 | 12/1983 | Christopher et al. | 358/340 |
| 4,538,268 | 8/1985 | Van Cang | 371/20 |
| 4,613,908 | 9/1986 | Takahashi et al. | 358/335 |
| 4,628,361 | 12/1986 | Andreas | 358/31 |
| 4,635,096 | 1/1987 | Morgan | 358/139 |
| 4,670,782 | 6/1987 | Harshbarger et al. | 358/139 |
| 4,769,703 | 9/1988 | Osborne et al. | 358/139 |

FOREIGN PATENT DOCUMENTS 3319614 12/1984 Fed. Rep. of Germany .
2126454 3/1984 United Kingdom .

OTHER PUBLICATIONS

IEEE Transactions On Broadcasting, vol. BC-26, No. 3, Sep. 1980 "Digital Generation of Test Signals For Colour Television"; pp. 82–90; Burkies, Wade.
Ein Digitaler HDTV-Testbildgenerator zur Erzeugung von zeitveranderlichen Mustern; Fernseh-Und Kino-Technik; 40 Jahrgang No. 1/1986; Gaus; pp. 3–7.

Primary Examiner—Parshotam S. Lall
Assistant Examiner—V. Trans
Attorney, Agent, or Firm—Frishauf, Holtz, Goodman & Woodward

[57] ABSTRACT

First to third memories store a plurality of functions constituting polynomials respectively representing at least one-line luminance, chrominance, and sync signal waveforms included in a television testing signal to be generated and a plurality of parameter values for defining the plurality of functions. First to third expansion sections receive the functions and parameter values of the respective signal waveforms from the first to third memories so as to calculate the magnitude values of the respective signal waveforms for the corresponding time base postions. Fourth to sixth memories receive the outputs from the first to third expansion sections so as to store the magnitude values of the respective signal waveforms at the corresponding time base positions for at least one-line data of the television testing signal to be generated.

9 Claims, 20 Drawing Sheets

| WAVE-FORM NUMBER | Y POLYNOMIAL | | C POLYNOMIAL | | SYNC POLYNOMIAL | | LINE POLYNOMIAL | | ELEMENT LEVEL | | PARAMETER UPDATING EQUATION POINTER |
|---|---|---|---|---|---|---|---|---|---|---|---|
| | NUMBER | POINTER | NUMBER | POINTER | NUMBER | POINTER | NUMBER | POINTER | NUMBER | POINTER | |
| 0 | Yn | Yp | Cn | Cp | Sn | Sp | Ln | Lp | ℓn | ℓp | Pp |
| 1 | | | | | | | | | | | |
| 2 | | | | | | | | | | | |
| 3 | | | | | | | | | | | |
| 4 | | | | | | | | | | | |

F I G. 6

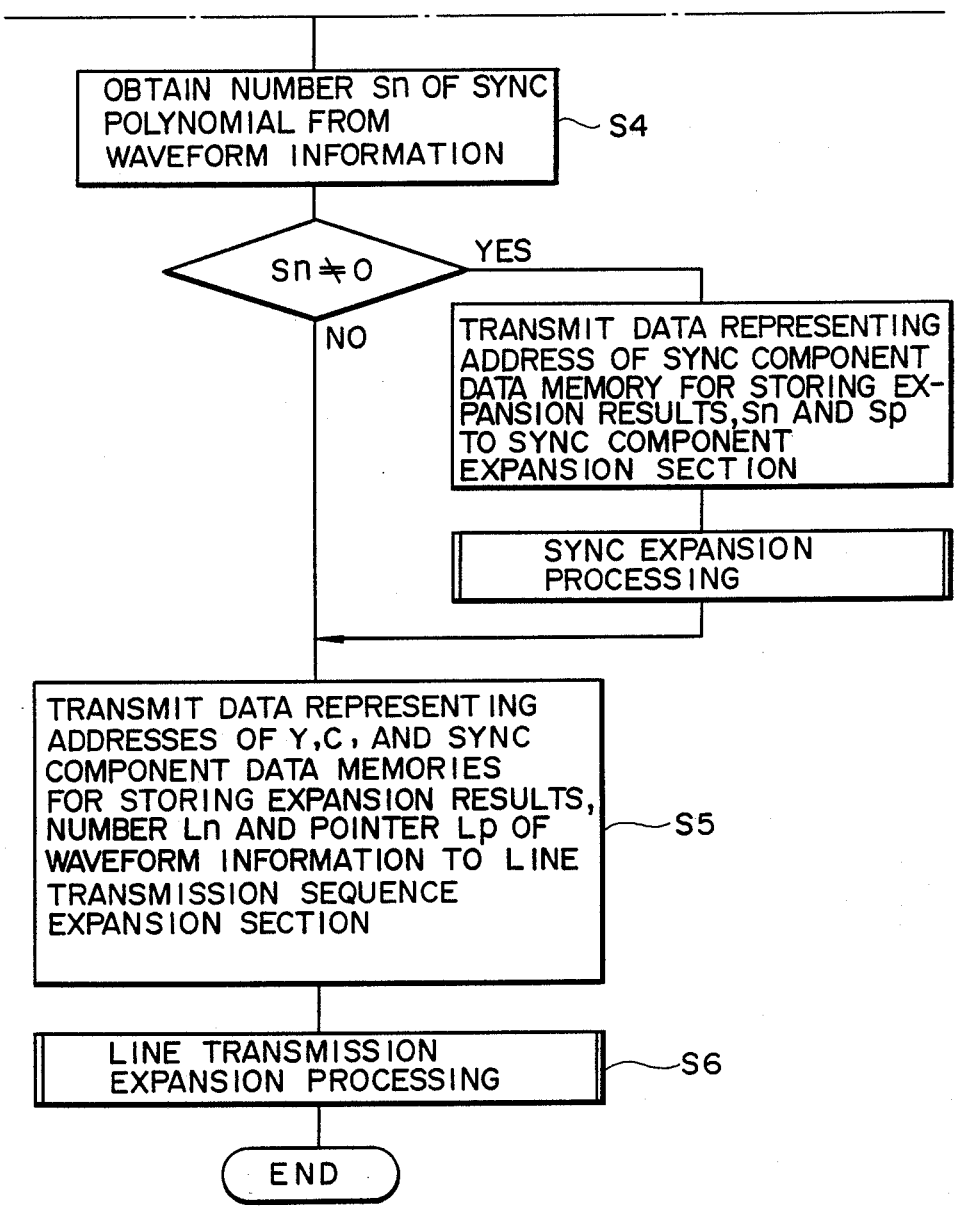
F I G. 7B

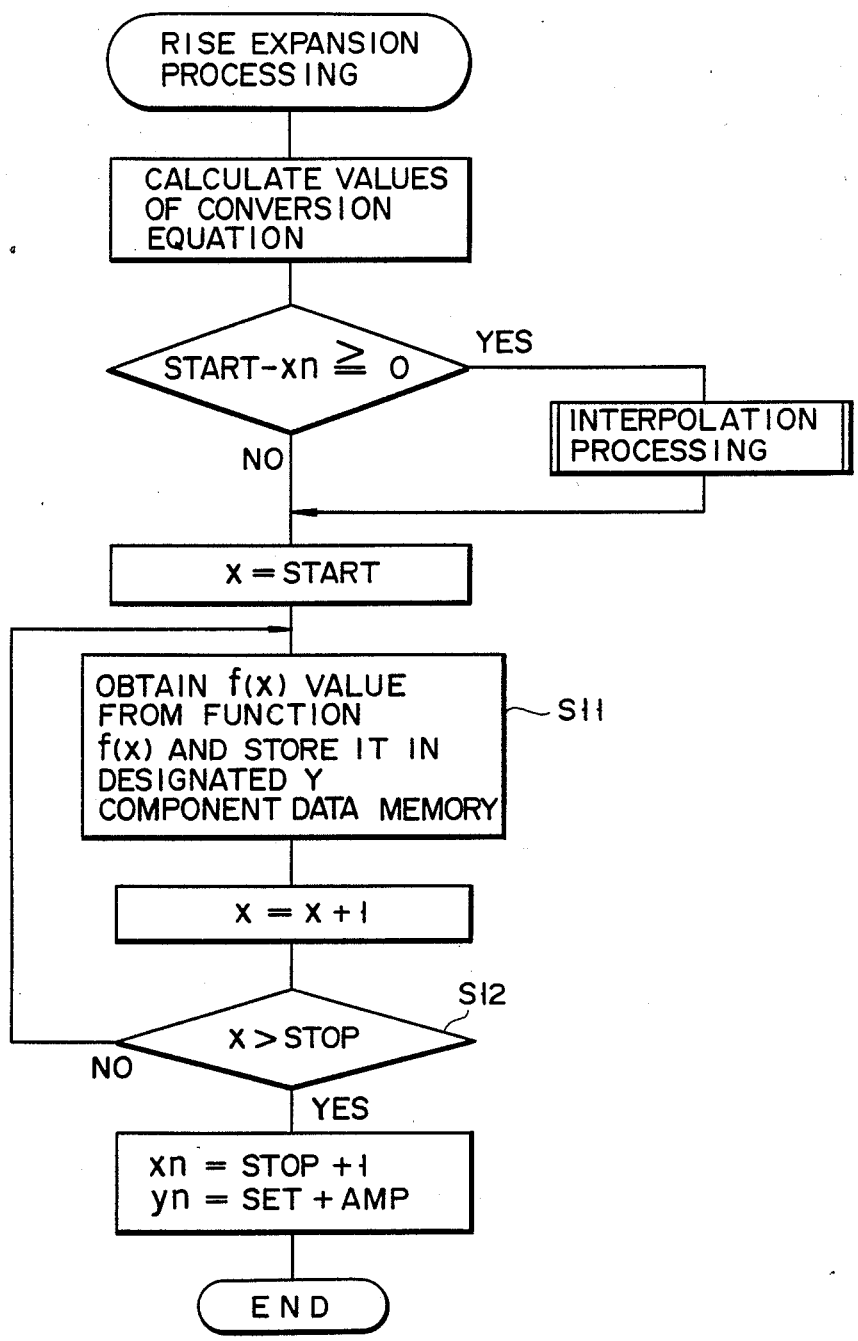
F I G. 9

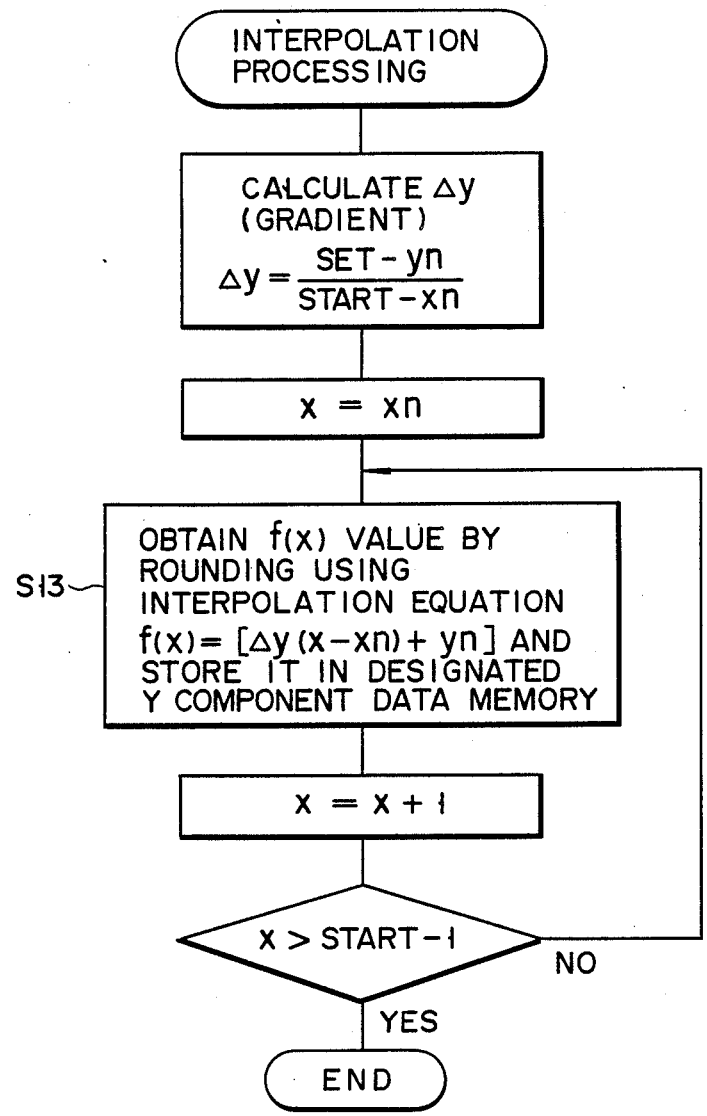
F I G. 10

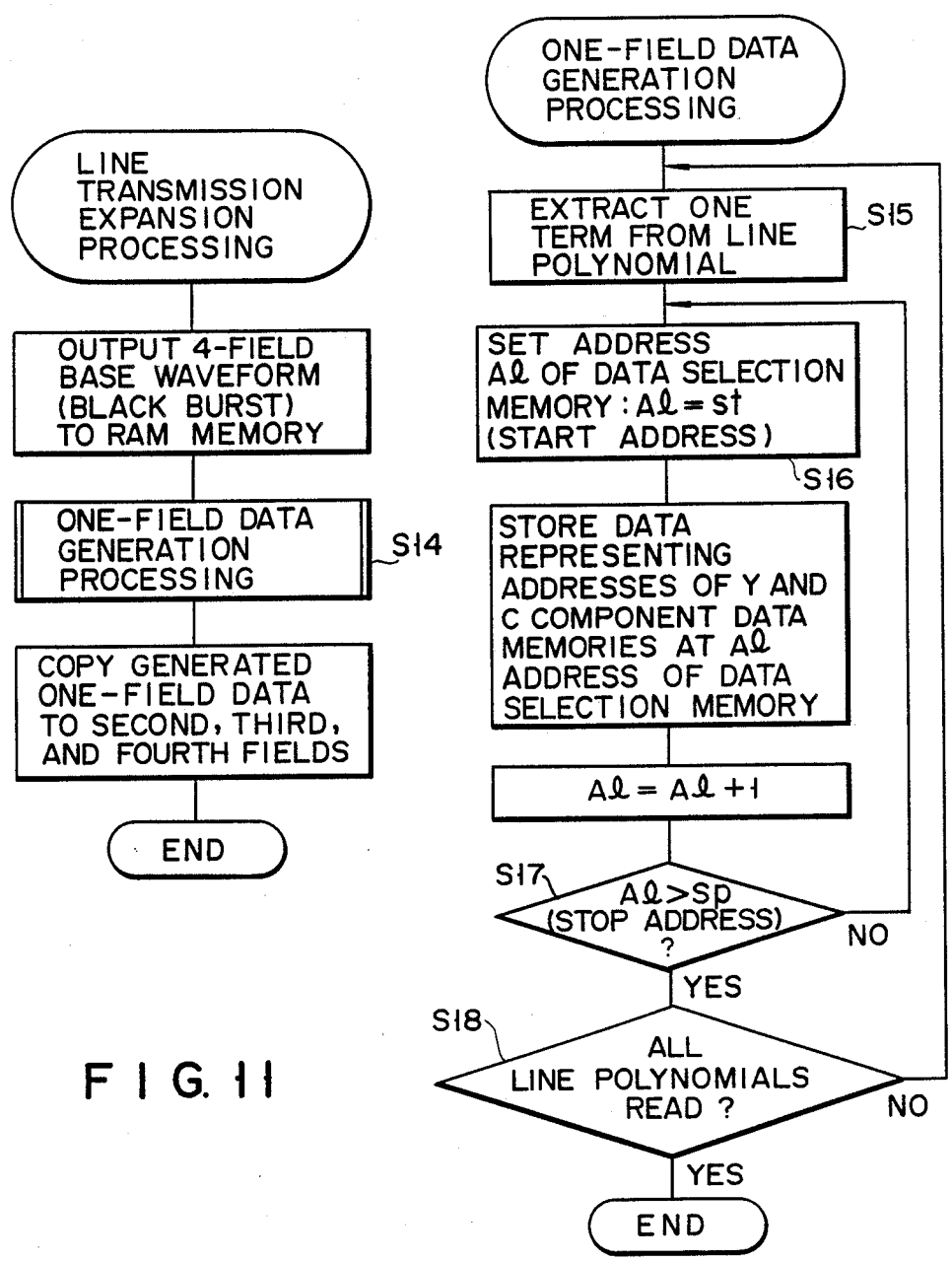
F I G. 11
F I G. 12

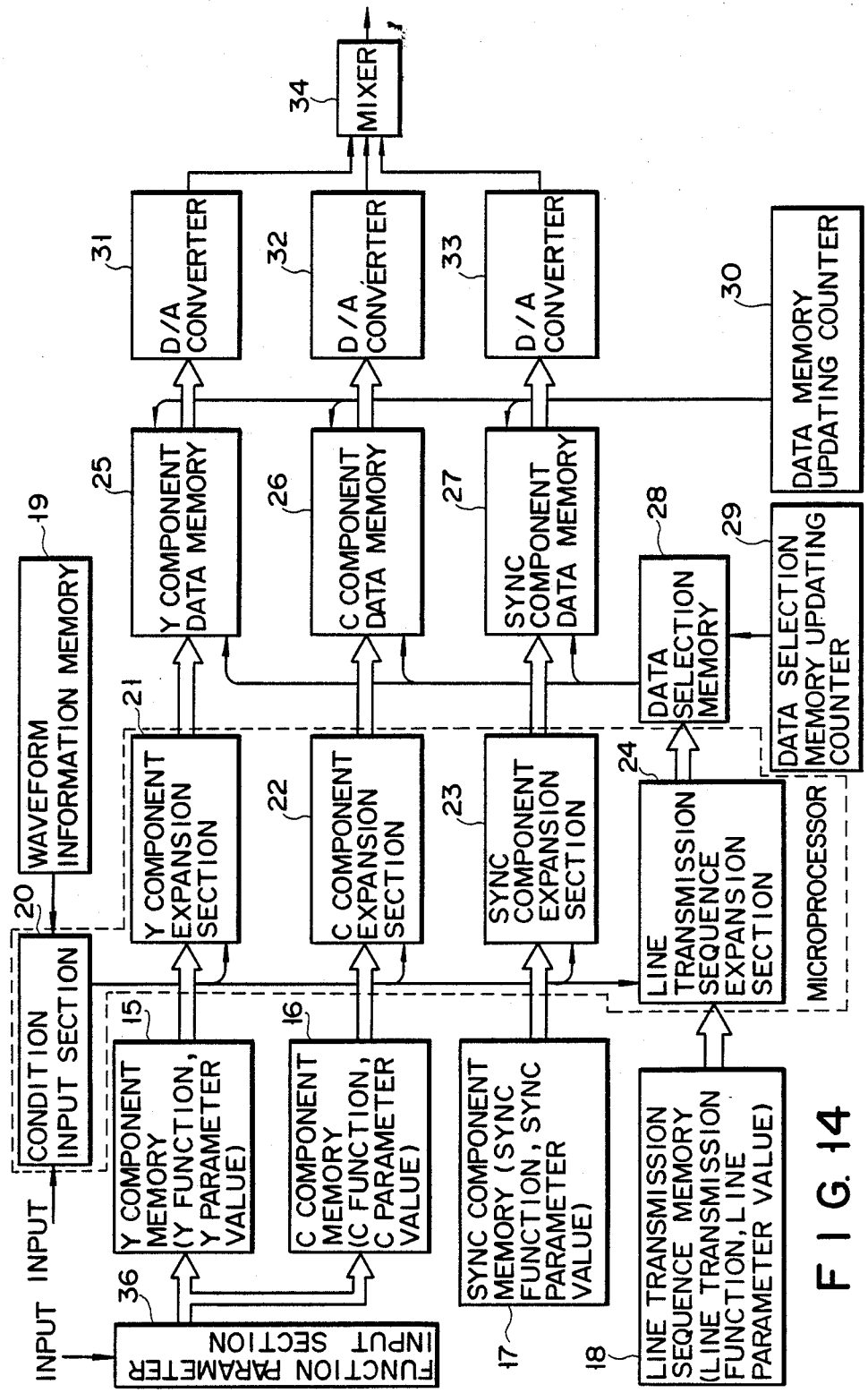
F I G. 14

MULTI-FUNCTIONALITY TELEVISION TESTING SIGNAL GENERATOR USING DIGITAL SCHEME

BACKGROUND OF THE INVENTION

1. Field of the Invention

This invention relates to a multi-functionality television testing signal generator using a digital scheme and, more particularly, to a television signal generator for generating television testing signals for testing transmission paths in a television system and its associated apparatuses.

2. Description of the Related Art

When in transmission paths in a television broadcast system or each constituent circuit in a television set or a video tape recorder are tested to determine whether they are normally operated, a television testing signal having a predetermined waveform is applied to each device to be tested, and it is checked whether a normal test image is displayed on, e.g., a cathode-ray tube in the television.

The waveforms of such television testing signals are defined by various official organizations such as the International Radio Consultative Committee (CCIR) and the Federal Communications Commission (FCC), and are recommended to be used.

As is known, an NTSC television signal constituting one TV picture consisting of 525 scanning lines is roughly divided into a field-blanking period and a picture line period, as shown in FIG. 20. The field-blanking period is constituted by a 3H-equalizing pulse pre-period, a 3H-vertical synchronizing pulse period, a 3H-equalizing pulse post-period, and a black burst period. The picture line period is constituted by video signals 2 divided by horizontal sync signals 1.

The equalizing pulse, the vertical synchronizing pulse, and the black burst (color burst signal) respectively have the waveforms shown in FIGS. 21A, 21B, and 21C. If video signal 2 for a picture line period is a composite signal defined by the CCIR, it is composed of a plurality of elements 3, as shown in FIG. 21D, while the waveforms of the elements 3 are respectively defined.

In a television signal generator for generating such a television testing signal, high signal generation precision is required. The circuit size of a signal generator using analog circuit elements becomes large. In addition, satisfactory stability of output signals cannot be obtained in such a signal generator. For this reason, a television signal generator using a digital technique has been developed.

FIG. 22 is a block diagram showing a schematic arrangement of a conventional television testing signal generator using a digital technique. Referring to FIG. 22, reference numeral 4 denotes a ROM for storing each peak value (data value) converted into a 10-bit digital value. Each peak value is obtained by sampling a plurality of signal waveforms as a construction unit the line period of a television signal on the time base (dividing one line into 3640 equal parts), respectively. One-line data values including black burst data, equalizing pulse data, vertical synchronizing pulse data, testing signal data, etc. are stored in each line of the ROM 4. More specifically, an upper address of an address representing a storage position of each data value represents each line from 1 to 525 lines, whereas a lower address represents a position of each waveform on the time base. Vertical scanning address counter 5 is updated by a clock synchronized with a line frequency (about 15 kHz). An output from vertical scanning address counter 5 designates each output data value of waveform output designating memories 6a, 6b, and 6c of ROM 6. Each of memories 6a to 6c stores upper address information of ROM 4 regarding the output line location of the waveforms shown in FIGS. 21A to 21C. According to this example, three types of output sequences are stored. Every time the output value of vertical scanning address counter 5 is updated, information for designating a line to be output, i.e., the upper address value of a read-out data value from ROM 4 is supplied to ROM selector 7. ROM selector 7 supplies only the upper address from one of waveform output designating memories 6a to 6c designated by a waveform selection signal input from operation panel 8. When the line data to be supplied to ROM 4 is designated by the upper address, one-line address counter 9 sequentially designates the lower addresses of the designated line data at a frequency 3640 times the line frequency (about 16 times subcarrier frequency fs), i.e., about 57 MHz. As a result, peak values constituting the waveforms of the designated line data along the time base are sequentially output and supplied to D/A converter 10. Thus, the one-TV-picture (one-frame) television signal designated by operation panel 8 is output from D/A converter 10.

The peak values along the time base obtained by sampling the respective signal waveforms constituting the television testing signal at a predetermined frequency are stored in ROM 4 as the digital values in this manner, thereby greatly improving electrical stability of output television testing signals.

However, in the television signal generator arranged as shown in FIG. 22, the following problems are posed. As described above, since a one-line signal waveform is divided into 3640 equal parts, and each peak value is displayed with ten bits, one-line data is equal to (10 bits × 3640) words. In addition, since the three types of signals shown in FIGS. 21A, 21B, and 21C are always required, if the number of types of desired video signals 2 is N, ROM 4 requires a memory capacity of $$10 \text{ bit} \times 3.6 \text{ K words} \times (3+N).$$

For example, if number N of types of desired video signals 2 to be output is 100, a total memory capacity of 100×3.6 KW×10 bits is required provided that the field-blanking period in FIG. 20 is omitted. If 256−K (32.768 KW×8-bit) ROMs are used, 14 ROMs are required. Since a large number of memory elements are required in this manner, the manufacturing cost is increased.

In addition, a luminance signal component (Y component), a chrominance signal component (C component), and a sync signal component (SYNC) are included in each video signal 2. These components are separately detected in a television set. Since each peak value (data value) of the waveforms of video signal 2 obtained by mixing these components is converted into 10 bits, and is converted into an analog value by D/A converter 10, sufficient resolution cannot be obtained in D/A converter 10. Therefore, amplitude linearity of a television testing signal D/A-converted with insufficient resolution is degraded. As a result, a large quantization error may be included in the subsequent signal processing operations.

Furthermore, nonlinearity of D/A converter 10 may degrade phase linearity of a television testing signal.

As described above, the conventional digital television testing signal generator has the problem of memory capacity and its related problems mainly because ROMs are used as the waveform memories. With an improvement of a video system to be described later, another problem to be solved has been posed in the conventional generator, i.e., that it is not suitable for a multifunction system.

TV systems have been widely used as high-quality video media. In order to realize a high-quality of video media, IDTV, EDTV, and HDTV are respectively employed as feasible programs. The IDTV has already been put into practice.

According to another trend, the following home video has become commercially available. In this home video, an interface of composite signals is replaced with that of Y/C separation signals so as to realize a wideband video signal and obtain cross-color and dot interference prevention effects, and the like, thereby providing a clear image.

With these trends towards improvement in image quality, it is a very practical and important theme to obtain a high-quality image by applying various signal processing techniques especially to the existing TV systems.

That is, demands have arisen for realizing a multi-function type TV (video) signal generator capable of flexibly adapting itself to such a theme by utilizing digital techniques. However, a technique using waveform memories has the following limitations.

According to the fundamental principle of a signal generator using the digital techniques, waveform data prestored in a ROM or a RAM is D/A-converted to obtain an output signal. In the generator using the ROM, the output waveform cannot be changed or a user cannot arbitrarily form a waveform. The system using the RAM can perform the above operations. However, if a complex TV waveform is to be formed, problems are posed in terms of an internal realizing means, operability, a backup method for a formed waveform, and the like. According to a method of solving these problems, these operations may be controlled by an external computer, and the function of the system itself is limited to simple memory and output means. In this case, however, the condition for a stand-alone type cannot be satisfied.

SUMMARY OF THE INVENTION

It is, therefore, an object of the present invention to provide a new and improved multi-functionality television testing signal generator using a digital scheme which can achieve sufficient multi-functionality.

According to the present invention, there is provided a television testing signal generator comprising:

first memory means for storing a plurality of functions constituting a polynomial representing at least a one-line luminance signal waveform included in a television testing signal to be generated, and for storing a plurality of parameter values for defining the functions;

second memory means for storing a plurality of functions constituting a polynomial representing at least a one-line chrominance signal waveform included in the television testing signal to be generated, and for storing a plurality of parameter values for defining the functions;

third memory means for storing a plurality of functions constituting a polynomial representing at least a one-line sync signal waveform included in the television testing signal to be generated, and for storing a plurality of parameter values for defining the functions;

first expansion means for receiving the functions and the parameter values of the luminance signal waveform from the first memory means so as to calculate a magnitude value of the luminance signal waveform for each time base position;

second expansion means for receiving the functions and the parameter values of the chrominance signal waveform from the second memory means so as to calculate a magnitude value of the chrominance signal waveform for each time base position;

third expansion means for receiving the functions and the parameter values of the sync signal waveform from the third memory means so as to calculate a magnitude value of the sync signal waveform for each time base position;

fourth memory means for receiving an output from the first expansion means so as to store a magnitude value of the luminance signal waveform at each time base position corresponding to at least one line of the television testing signal;

fifth memory means for receiving an output from the second expansion means so as to store a magnitude value of the chrominance signal waveform for each time base position corresponding to at least one line of the television testing signal; and sixth memory means for receiving an output from the third expansion means so as to store a magnitude value of the sync signal waveform for each time base position corresponding to at least one line of the television testing signal.

BRIEF DESCRIPTION OF THE DRAWINGS

These and other objects and features of the present invention can be understood through the following embodiments by reference to the accompanying drawings, in which:

FIGS. 2 to 5 are views for explaining an operation principle of the present invention, in which FIGS. 2A to 2D and FIGS. 3A to 3D are timing charts, and FIG. 4 and FIGS. 5A to 5D are views showing relationships between waveforms and functions;

FIG. 6 is a view showing the storage contents in the apparatus according to the embodiment;

FIGS. 7A and 7B to 12 are flow charts showing an operation of the apparatus according to the embodiment;

FIGS. 13A and 13B, FIG. 14, FIGS. 15 and 18, are block diagrams each showing a schematic arrangement of a television signal generator according to another embodiment of the present invention;

DETAILED DESCRIPTION OF THE PREFERRED EMBODIMENTS

Embodiments of the present invention will be described below with reference to the accompanying drawings.

Figure 2:
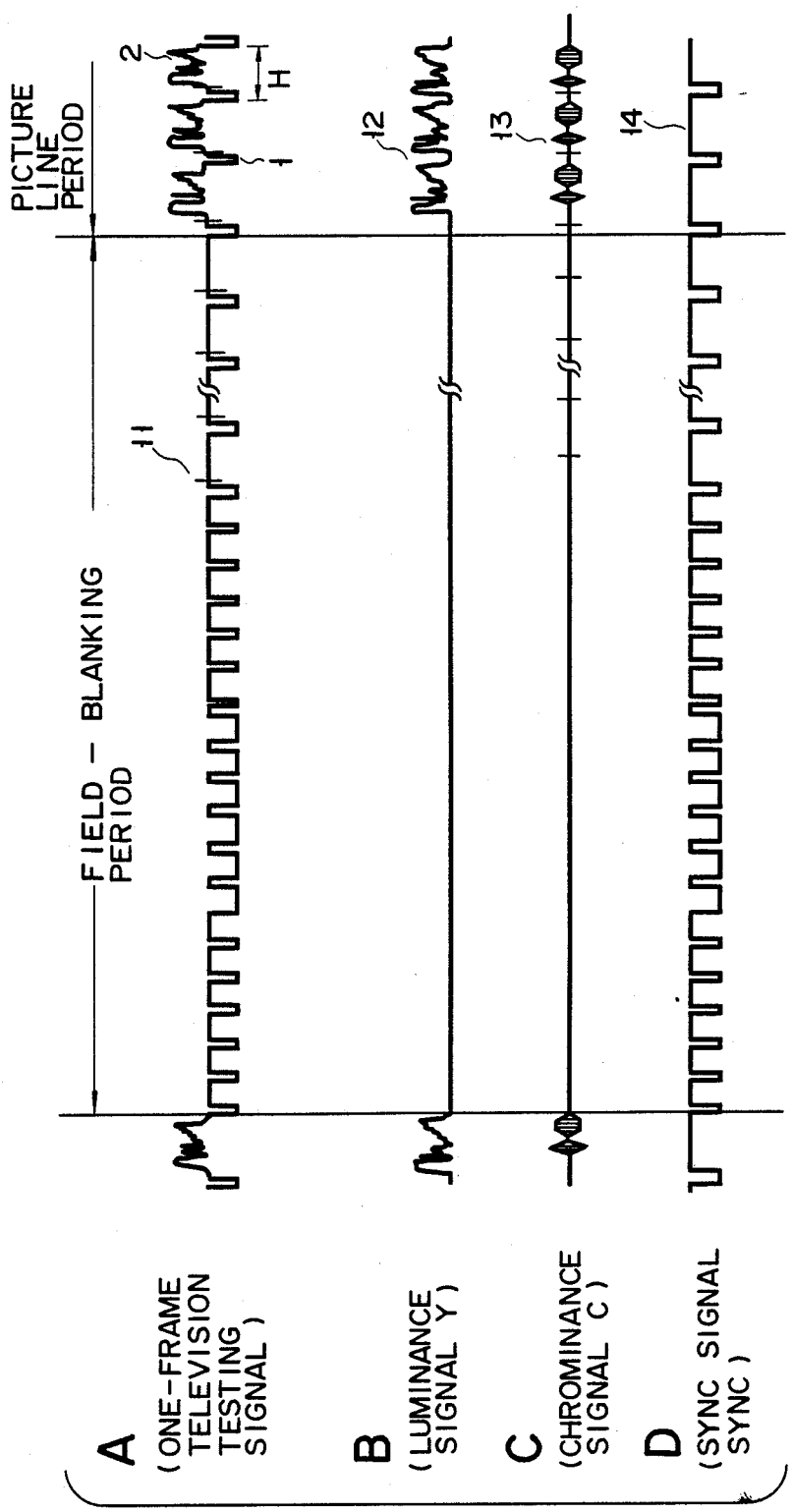
Figure 3:
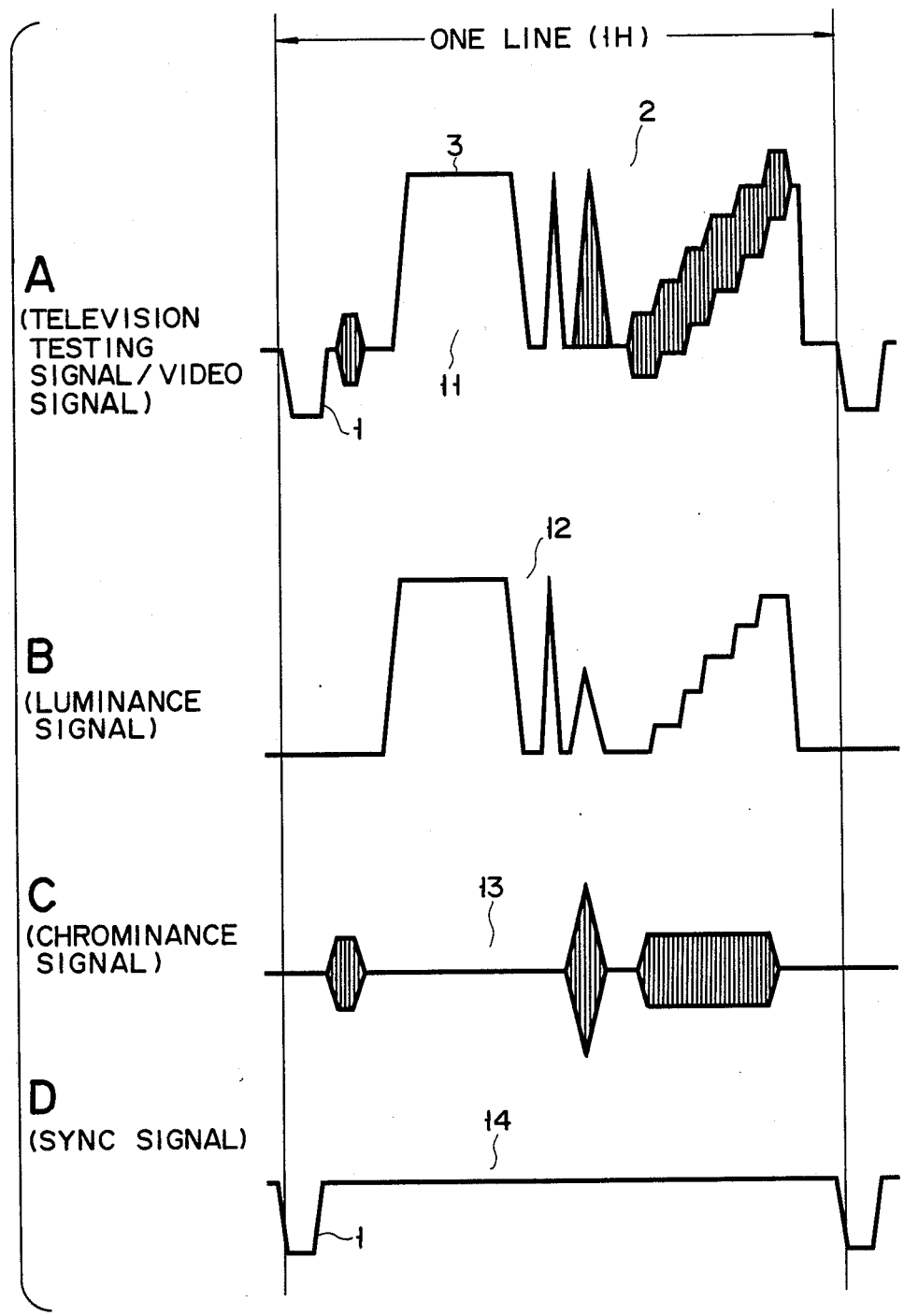

The operation principle of the present invention will be described with reference to FIGS. 2 to 5 and Tables 1 and 2. As shown in FIGS. 2A to 2D, the signal waveform of television testing signal 11 consisting of field-blanking and picture line periods can be decomposed into luminance signal 12, chrominance signal 13, and sync signal 14. FIG. 3A is an enlarged view of the waveform of one-line video signal 2, which is divided by horizontal sync signals 1, of television testing signal 11 within the video line period. Video signal 2 has the composite waveform defined by the CCIR described above. Therefore, magnitude value (level value) l, width W, start position Ps, central position Pc, rise time Sr, fall time Sf, offset value Su, frequency Fr, phase Ph, and the like, all of which determine the shape of each waveform element 3 constituting a video signal waveform, are predetermined.

Consequently, the above-described parameter values for determining the waveforms of luminance signal 12, chrominance signal 13, and sync signal 14 decomposed from television testing signal 11 are respectively set to be constant values.

Figure 4:
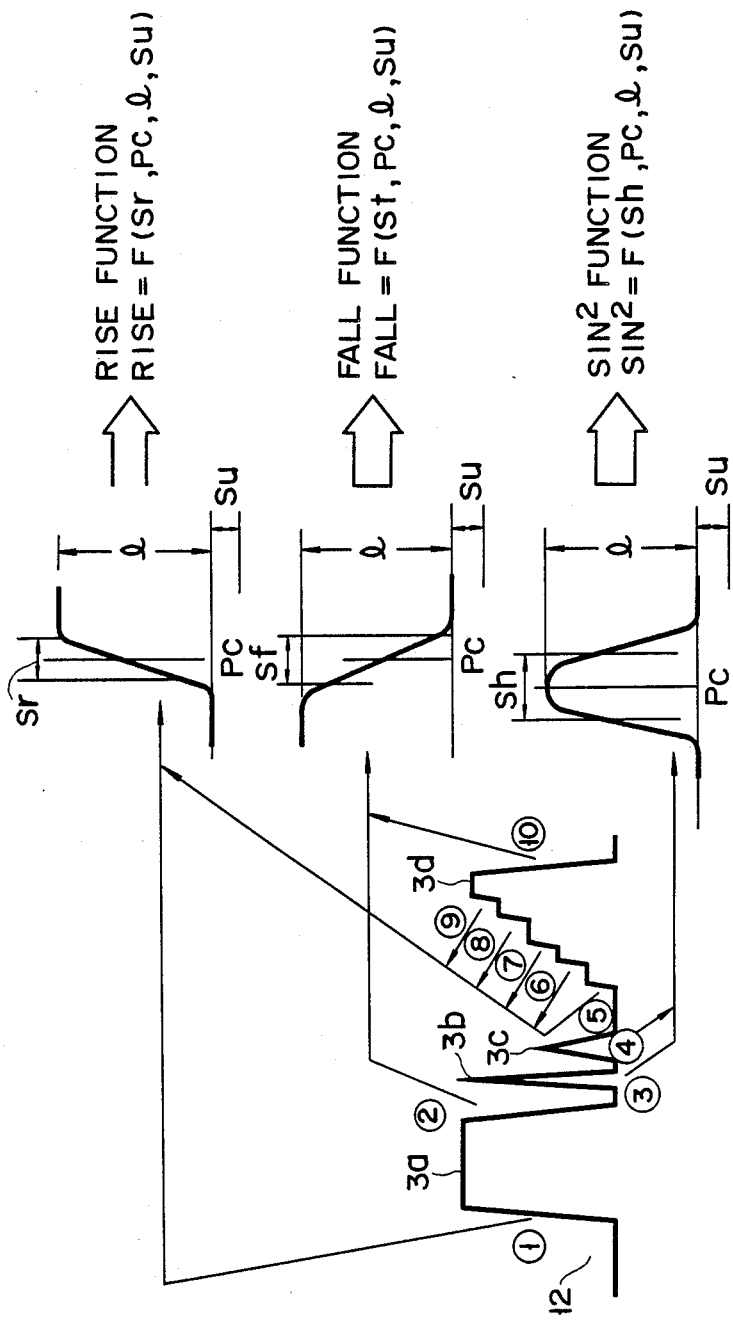

FIG. 4 is a view for explaining the steps of expanding decomposed luminance signal 12 into a polynomial formed by 10 functions, to ① to ⑩. This luminance signal waveform can be represented by three functions, namely, a rise function (RISE), a fall function (FALL), and a $\sin^2$ function ($SIN^2$), defined each time period, respectively. For example, the left and right sides of trapezoidal first element 3a of the luminance signal waveform can be respectively approximated by the rise and fall functions. The upper side of element 3a is automatically formed by an interpolation equation. Each of second and third elements 3b and 3c is approximated by the $\sin^2$ function. Last stepped element 3d can be approximated by five rise functions and one fall function. Theses elements are automatically coupled to each other by the interpolation equation. Since this interpolation equation can be commonly applied to each signal waveform, it is not included in the polynomial and is automatically calculated when the value of this polynomial is calculated. In addition, a "start code" and an "end code" are respectively appended to the start and end positions of the polynomial. These codes do not influence the actual calculation value.

As shown in FIG. 4, the rise function (RISE) is a function of the respective parameter values, namely, rise time Sr [T], central position Pc [μSEC], magnitude value (level value) l [IRE], and offset value Su [IRE]. Similarly, the fall function (FALL) is a function of the respective parameter values, namely, Sf, Pc, l, and Su. The $\sin^2$ function is a function of the respective parameter values, namely, Sr, Pc, l, and Su.

FIGS. 5A to 5D are views respectively showing functions, which are not used for luminance signal 12 in the embodiment, but are used for chrominance and sync signals 13 and 14. As shown in FIGS. 5A to 5D, a sin function (SIN) to be used for chrominance signal 13 is a function of the respective parameter valves, i.e., Sr, start position Ps [μSEC], phase ph [deg], l, Su, frequency Fr [MHz], and width W [μSEC]. Similarly, a burst function (BUST) and a position function (POIT) serve as functions of the respective parameter values shown in FIGS. 5A to 5D.

In addition, a fill function (FILL), which is used to designate a storage address of a memory when a oneline data value is transmitted, is defined by start position St [line address], stop position Sp [line address], yB [luminance memory address], and cB [chrominance memory address].

As described above, each function can be represented by a plurality of parameter values. However, when a function value of each function is actually calculated, the conversion and execution equations shown in Tables 1 and 2 are used. For example, in the rise function (RISE), seven intermediate parameter values "had" to "set" are calculated using seven conversion equations, and then the resultant values are substituted into the execution equation to yield a function value. Reference symbol x in execution equation f(x) denotes an axis of abscissa, i.e., time.

TABLE 1

| Function | Parameter | Conversion Equation | | Execution Equation | |
| --- | --- | --- | --- | --- | --- |
| RISE | Sr[T] | had = 1·694·T·Sr | [SEC] | | |
| | | start = [(Pc − had/2)·Fsmp]round-up | [ADRS] | | |
| | | stop[(Pc + had/2)·Fsmp]round-off | [ADRS] | | |
| | Pc[μSEC] | amp = [l·Sensitivity]rounding | [LSB] | $f_{(x)} = [amp \cdot \sin^2(a \cdot x + \theta) +$ | |
| | | | | $set + Pedestal]rounding$ | |
| | l[IRE] | $a = \dfrac{2\pi}{4 \cdot had \cdot Fsmp}$ | [RAD/ADRS] | x = start, start + 1, .... | |
| | | | | stop − 1, stop | |
| | Su[IRE] | $\theta = Pc \cdot \left(\dfrac{-2\pi}{4 \cdot had}\right) + \dfrac{\pi}{4}$ | [RAD] | | |
| | | set = [Su·Sensitivity]rounding | [LSB] | | |
| FALL | Sf[T] | had = 1.694·T·Sf | [SEC] | | |
| | | start = [(Pc − had/2)·Fsmp]round-up | [ADRS] | | |
| | Pc[μSEC] | stop[(Pc + had/2)·Fsmp]round-off | [ADRS] | | |
| | | amp = [l·Sensitivity]rounding | [LSB] | $f_{(x)} = [amp \cdot \sin^2(a \cdot x + \theta) +$ | |
| | | | | $set + Pedestal]rounding$ | |
| | l[IRE] | $a = \dfrac{2\pi}{4 \cdot had \cdot Fsmp}$ | [RAD/ADRS] | x = start, start + 1, ..., | |
| | | | | stop − 1, stop | |
| | Su[IRE] | $\theta = Pc \cdot \left(\dfrac{-2\pi}{4 \cdot had}\right) + \dfrac{3\pi}{4}$ | [RAD] | | |

TABLE 1-continued

| Function | Parameter | Conversion Equation | Execution Equation |
|---|---|---|---|
| | | set = [Su · Sensitivity]rounding [LSB] | |

TABLE 2

| Function | Parameter | Conversion Equation | | Execution Equation |
|---|---|---|---|---|
| SIN$^2$ | Sh[T] | had = Sh · T | [SEC] | |
| | | start = [(Pc − had) · Fsmp]round-up | [ADRS] | |
| | | stop = [(Pc + had) · Fsmp]round-off | [ADRS] | |
| | Pc[μSEC] | amp = [l · Sensitivity]rounding | [LSB] | $f_{(x)}$ = [amp · sin$^2$(a · x + θ) + set + Pedestal]rounding |
| | l[IRE] | $a = \dfrac{2\pi}{4 \cdot \text{had} \cdot \text{Fsmp}}$ | [RAD/ADRS] | x = start, start + 1, . . . , stop − 1, stop |
| | Su[IRE] | $\theta = Pc \cdot \left( \dfrac{-2\pi}{4 \cdot \text{had}} \right) + \dfrac{\pi}{2}$ | [RAD] | |
| SIN BUST POIT | | set = [Su · Sensitivity]rounding | [LSB] | |

*T = 125 ns(NTSC scheme)
Fsmp: sampling frequency (= 57.27 MHz in this embodiment)
Sensitivity: sensitivity (= 6 LSB/IRE in this embodiment)

The polynomial of the luminance signal waveform in FIG. 4 is formed using the conversion and execution equations in Tables 1 and 2. Each function value f(x) of ten functions RISE ① to FALL ⑩ at position x on the time base is obtained. By combining each function value calculated for each time period, the magnitude value (data value) of the luminance signal waveform at position x can be obtained.

The magnitude value of each of luminance signal 12, chrominance signal 13, and sync signal 14 at the same position x is calculated in this manner and the resultant values are added together, thereby obtaining the magnitude value of the overall original television testing signal at position x. Then, value x is sequentially updated so as to obtain a one-line television testing signal.

Figure 1:
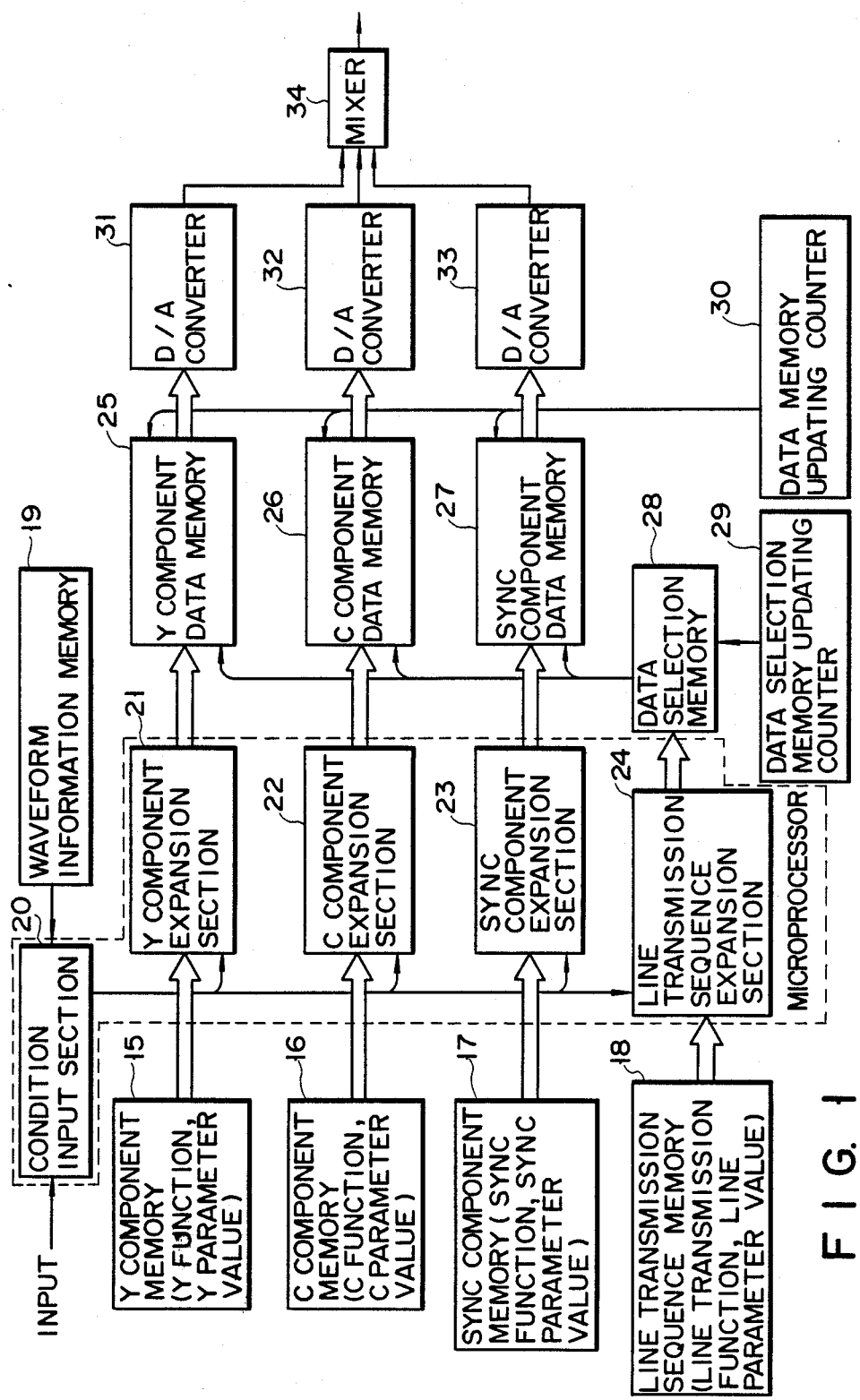
FIG. 1 is a block diagram showing a schematic arrangement of a television signal generator according to an embodiment of the present invention.

FIG. 1 is a block diagram showing a television signal generator for generating a television testing signal in accordance with the above-described operation principle. The respective functions and parameter values constituting the polynomial of luminance signal 12 shown in FIG. 4 are stored in luminance component memory 15 constituted by a storage element such as a ROM or a RAM. The respective functions and parameter values constituting the polynomial of chrominance signal 13 are stored in chrominance component memory 16. The respective values of the functions and parameters constituting the polynomial of sync signal 14 are stored in sync component memory 17. In addition, line transmission sequence memory 18 stores a line transmission sequence function for forming the output sequence of signals 12, 13, and 14 in every line and line parameter values for obtaining this function value.

As shown in FIG. 6, waveform information memory 19 stores number Yn of functions in the luminance (Y) polynomial and storage pointer Yp of luminance component memory 15; number Cn of functions, in the chrominance (C) polynomial and storage pointer Cp of chrominance component memory 16; number Sn of functions, in the sync (SYNC) polynomial and storage pointer Sp of sync component memory 17; number Ln of functions, in the line transmission sequence polynomial and storage pointer Lp of line transmission sequence memory 18, and the like for every waveform number of television testing signals to be output by the television signal generator. Note that the waveform number of the composite waveform described above is [1].

When the waveform number of a television testing signal is externally input to condition input section 20 shown as, e.g., a program processing sequence of a microprocessor, condition input section 20 supplies numbers Yn, Cn, Sn, and Ln of the polynomials functions of the corresponding waveform number and corresponding pointers Yp, Cp, Sp, and Lp from waveform information memory 19 to luminance component expansion section 21, chrominance component expansion section 22, sync component expansion section 23, and line transmission sequence expansion section 24.

Luminance component expansion section 21 shown as the program processing sequence of the microprocessor reads out the luminance (Y) polynomial and each parameter value designated by condition input section 20 from luminance component memory 15, calculates the magnitude value (data value) of the luminance signal waveform at each position x on the time base, and displays the resultant value with, e.g., 10 bits.

The interval between time base positions x is set to correspond to a value of 1/3640 in one line. That is, one magnitude value corresponds to a value sampled at a frequency ($\approx$ 57 MHz) which is 16 times that of subcarrier frequency fs.

The calculation results are stored in storage addresses in luminance component data memory 25 designated by condition input section 20 through luminance component expansion section 21. Luminance component data memory 25 has a capacity capable of storing a maximum of 16 types of one-line luminance signal waveform data.

Similarly, chrominance and sync component expansion sections 22 and 23 respectively read out the chrominance (C) polynomial and each parameter value, and the sync (SYNC) polynomial and each parameter value, which are designated by condition input section 20, from chrominance and sync component memories 16 and 17, respectively. Then, sections 22 and 23 respectively calculate the magnitude values of the chrominance and sync signals and supply the calculation results to chrominance component data memory 26 and sync component data memory 27.

Line transmission sequence expansion section 24 reads out the line polynomial and each parameter value designated by condition input section 20 from line transmission sequence memory 18 and executes operations, thereby storing, in data selection memory 28, information of the output sequence of line data in every line.

Data selection memory 28 has a word length of (262.5 line × 4 field × 2 [because the information is set by 0.5 H unit]) and designates read addresses of upper address data of the respective one-line magnitude values (data values) in respective component data memories 25, 26, and 27 in accordance with the predetermined output sequence of the line data every time a count value is input from data selection memory updating counter 29 for every 0.5 H. Data memory updating counter 30 supplies the count value updated at a frequency ($\approx 57$ MHz) which is 16 times that of subcarrier frequency fs to respective component data memories 25, 26, and 27. Therefore, respective component data memories 25, 26, and 27 supply the magnitude values of the signal waveforms constituting the line data designated by data selection memory 28 at a frequency ($\approx 57$ MHz).

The digital magnitude values sequentially transmitted by component data memories 25, 26, and 27 are respectively input to D/A converters 31, 32, and 33. As a result, analog luminance, chrominance, and sync signals 12, 13, and 14 shown in FIGS. 2 and 3 are respectively output from D/A converters 31, 32, and 33. These analog signals 12, 13, and 14 are mixed by waveform mixer 34 serving as a waveform mixing section of the next stage, and are formed into one television testing signal 11.

Figure 7A:
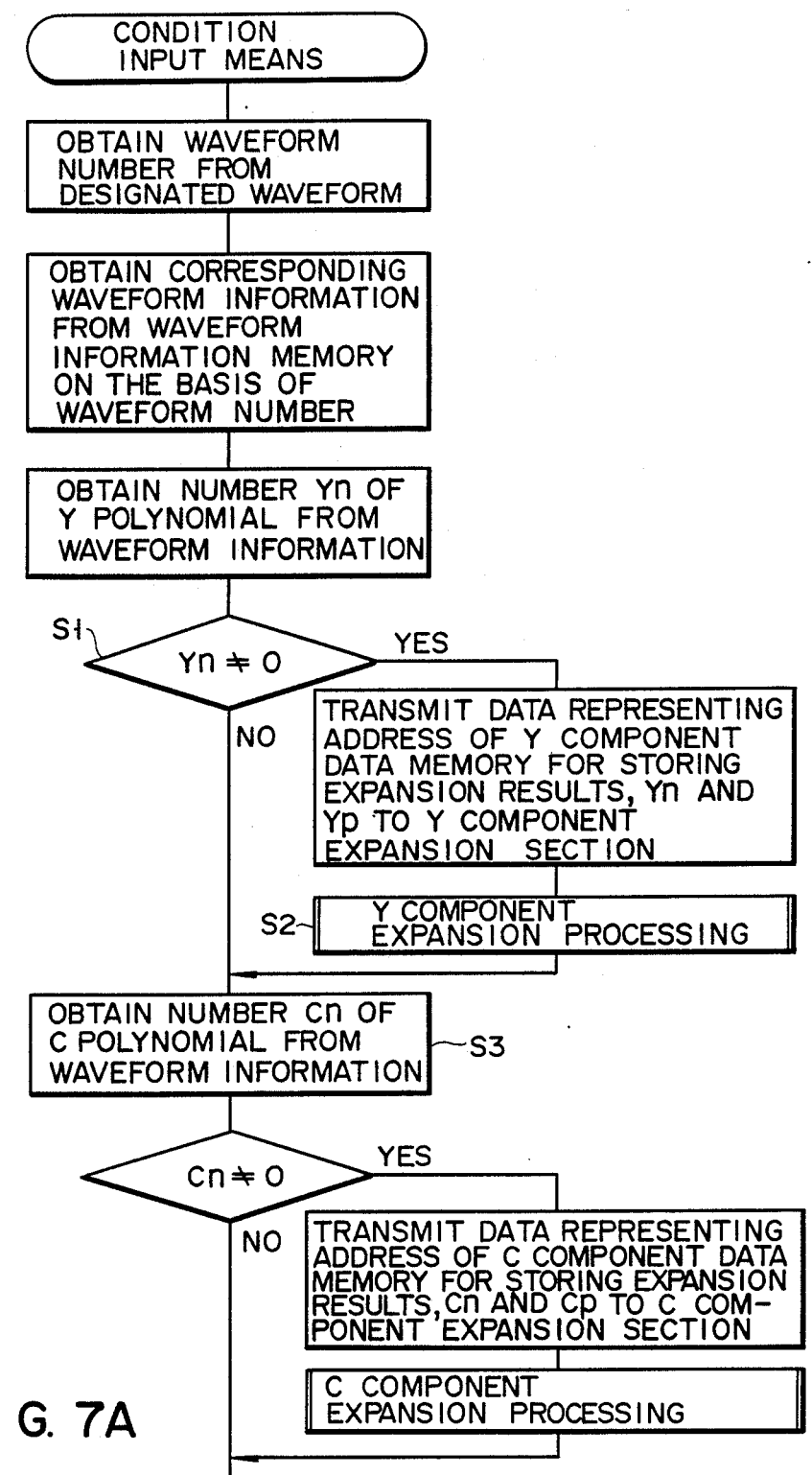

An actual program processing operation in condition input section 20 will be described with reference to the flow charts in FIGS. 7A and 7B. When a waveform number is externally input, the waveform information of the above-described polynomials corresponding to the waveform number are respectively obtained from waveform information memory 19. If number Yn of functions in the luminance (Y) polynomial is not 0 in step S1, condition input section 20 transmits data representing an address of luminance component data memory 25 for storing expansion results, number Yn of functions and storage pointer Pn to luminance component expansion section 21. Then, luminance component expansion processing is executed by luminance component expansion section 21 in step S2. If the luminance component expansion processing has been completed in step S2 or the polynomial of luminance signal 12 has not been preset, the flow advances to step S3, and number Cn of functions in the polynomial of chrominance signal 13 is then checked.

After chrominance signal 13 has undergone the same processing as luminance signal 12 in step S3, sync signal 14 is then processed in the same manner as luminance signal 12 in step S4.

When the sequence of processing of luminance, chrominance, and sync signals 12, 13, and 14 has been completed, condition input section 20 transmits data representing addresses of luminance, chrominance, and sync component data memories 25, 26, and 27 for storing respective expansion results number Ln and storage pointer Lp of the waveform information to line transmission sequence expansion section 24 in step S5. Subsequently, in step S6, line transmission expansion processing is executed.

Figure 8:
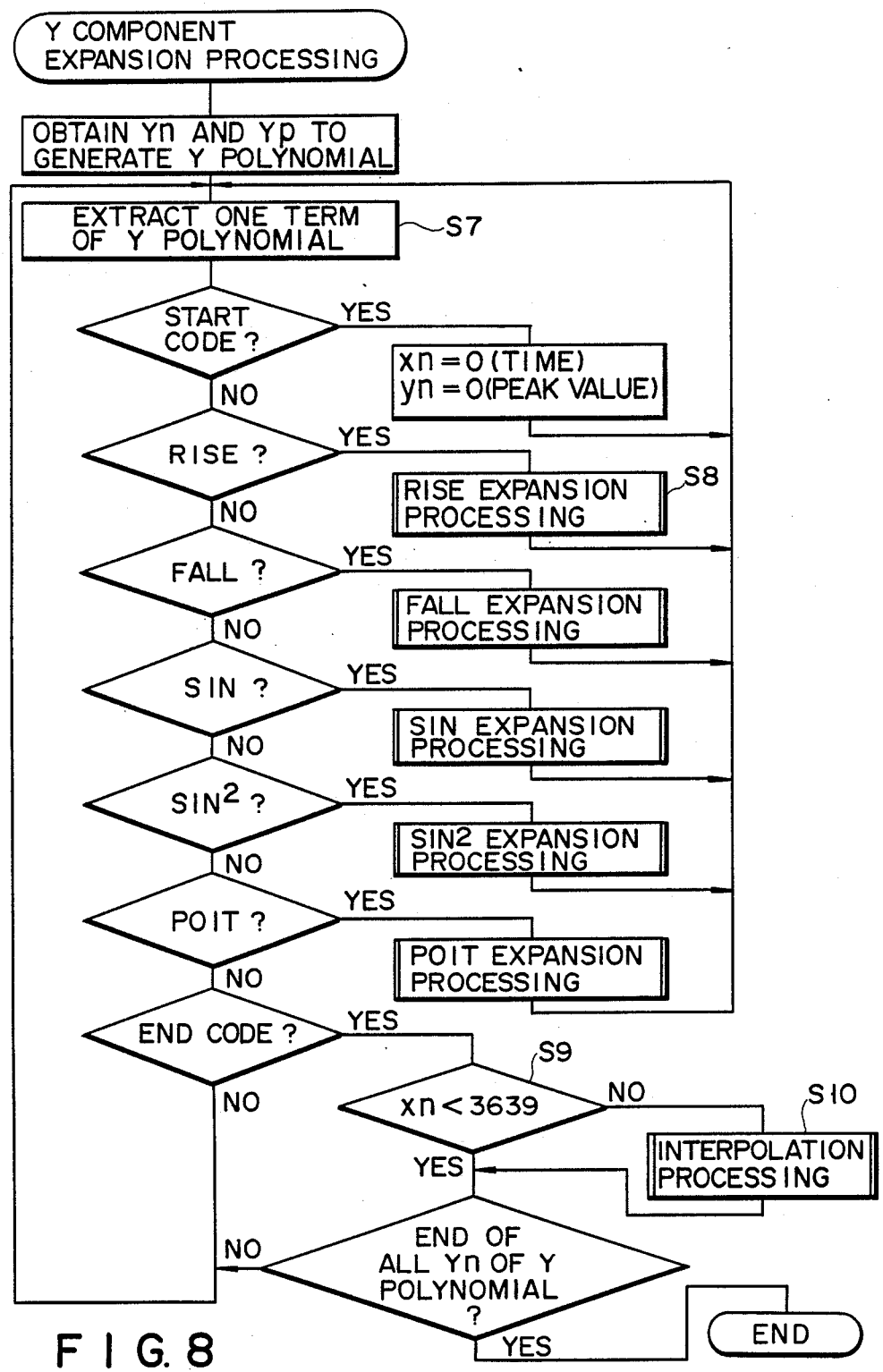

FIG. 8 is a flow chart showing the luminance component expansion processing to be executed by luminance component expansion section 21 in step S2 in FIG. 7. After the flow has been started, the Yn functions and the respective parameters values are read out from storage pointer Yp of luminance component memory 15 designated by condition input section 20 to obtain the luminance (Y) polynomial. Then, in step S7, a one-term function constituting the luminance polynomial is read out. If the readout function is the start code, xn representing the next x value on the time base and yn representing the next magnitude value are initialized to be 0. The flow returns to step S7 and the next function is read out. When the readout function is the rise function (RISE), the RISE expansion processing is executed in step S8 to obtain this function value. Upon completion of the expansion processing, the flow again returns to step S7 and the next function is read out and it is then expansion processed.

The expansion processing for the respective functions constituting the luminance polynomial is sequentially executed in this manner. When the end code has been obtained and xn has not reached the final value of 3639 in step S9, interpolation processing is executed in step S10, and then the luminance component expansion processing ends. If xn has reached the final value and it is confirmed that the processing for all Yn functions of the luminance polynomial has been completed, the processing is completed.

FIG. 9 is a flow chart showing the rise expansion processing in step S8 in FIG. 8. After the processing has started flowing, the respective intermediate parameter values of the conversion equation shown in Table 1 are calculated. If calculated intermediate parameter value start has reached xn, interpolation processing is executed. If it has not reached the value xn, x value is directly set to be the same as the start value. Then, function value f(x) in Table 1 is calculated in step S11, and the calculated f(x) value, i.e., the magnitude value at time base position x is stored at a designated storage address in luminance component data memory 25. After x value has been increased by one and it is confirmed that the resultant value does not exceed intermediate parameter value stop, the flow returns to step S11 and function value f(x) is calculated with respect to increased value x.

When the x value exceeds the stop value in step S12, xn and yn are respectively set as (stop + 1) and (set + amp).

FIG. 10 is a flow chart showing the interpolation processing in FIG. 8. When the processing has started flowing, the Δy value representing a gradient is calculated as:

$$\Delta y = (\text{set} - yn)/(\text{start} - xn)$$

After the x value has been set at xn, interpolation value f(x) is calculated using the interpolation equation shown in FIG. 10 in step S13. Calculated interpolation value f(x), i.e., the magnitude value at position x is stored at a designated address in luminance component data memory 25. Then, the x value is increased by one. If the increased x value does not exceed the value (start −1), a calculation of interpolation value f(x) is executed in step S13. If it exceeds the value (start −1), the interpolation processing ends.

FIG. 11 is a flow chart showing the line transmission expansion processing in step S6 in FIG. 7. First, a four-field black burst waveform is output to the RAM memory. In step S14, one-field data generation processing is executed. Then, the one-field line data generated in step S14 is copied to the second, third, and fourth fields.

FIG. 12 is a flow chart showing the one-field line data generation processing in step S14 in FIG. 11. When the processing starts to flow, one-term fill function (FILL) is read out from the line polynomial constituted by a plurality of fill functions (FILL) in FIG. 5 read out from line transmission sequence memory 18 in step S15. In step S16, address Al of data selection memory 28 is set to have the same value as the parameter value at start position St. Then, data representing storage addresses of luminance and chrominance data memories 25 and 26 designated by condition input section 20 are stored at address Al of data selection memory 28. Address Al is increased by one.

If increased address Al does not exceed the parameter value at stop position Sp in step S17, the flow returns to step S16 and the respective storage addresses are stored at updated address Al. When increased address Al exceeds the value at stop position Sp, the next fill function (FILL) is read out in step S15 and processing for the next fill function begins.

When processing of all the fill functions (FILL) constituting the polynomial has been completed in step S18, this one-field line data generation processing ends.

With the above-described operations, the generation processing of television testing signal 11 within the video line period in FIG. 2 is completed.

In the NTSC scheme, the signal generation processing within the field-blanking period can be commonly applied to all the television testing signals. Therefore, the signals in this period are automatically generated immediately after the apparatus is energized on the basis of the control programs, functions, and parameter values stored in a ROM.

In the television signal generator arranged in this manner, the functions and the parameter values of the respective polynomials of luminance, chrominance, and sync signals 12, 13, and 14 included in each television testing signal 11 to be output therefrom are respectively set in luminance, chrominance, and sync component memories 15, 16, and 17, and line transmission sequence memory 18. In addition, the storage pointers of component memories 15, 16, and 17, and line transmission sequence memory 18 corresponding to a waveform number are set in waveform information memory 19.

When the waveform number of the television testing signal to be output from this television signal generator has been supplied to condition input section 20, television testing signal 11 with the designated waveform number is output from waveform mixer 34.

According to the television signal generator arranged in this manner, in place of actual waveform data, only a plurality of functions and parameter values constituting the respective polynomials of luminance, chrominance, and sync signals 12, 13, and 14 obtained by decomposing television testing signal 11 are respectively stored in component memories 15, 16, and 17. An actual waveform is stored in respective memories 25, 26 and 27 by expanding the functions of the polynomials only number of waveforms necessary a using object since the waveforms different with the using object and mixing them together, and then the mixed waveform is output. For this reason, it is not necessary that respective component memories 25, 26, and 27 for storing actual waveforms store data of all testing signal waveforms. They are only required to store ten to twenty line data corresponding to the system or device under test. Therefore, the total memory capacity required for the overall apparatus can be greatly reduced.

Figure 22:
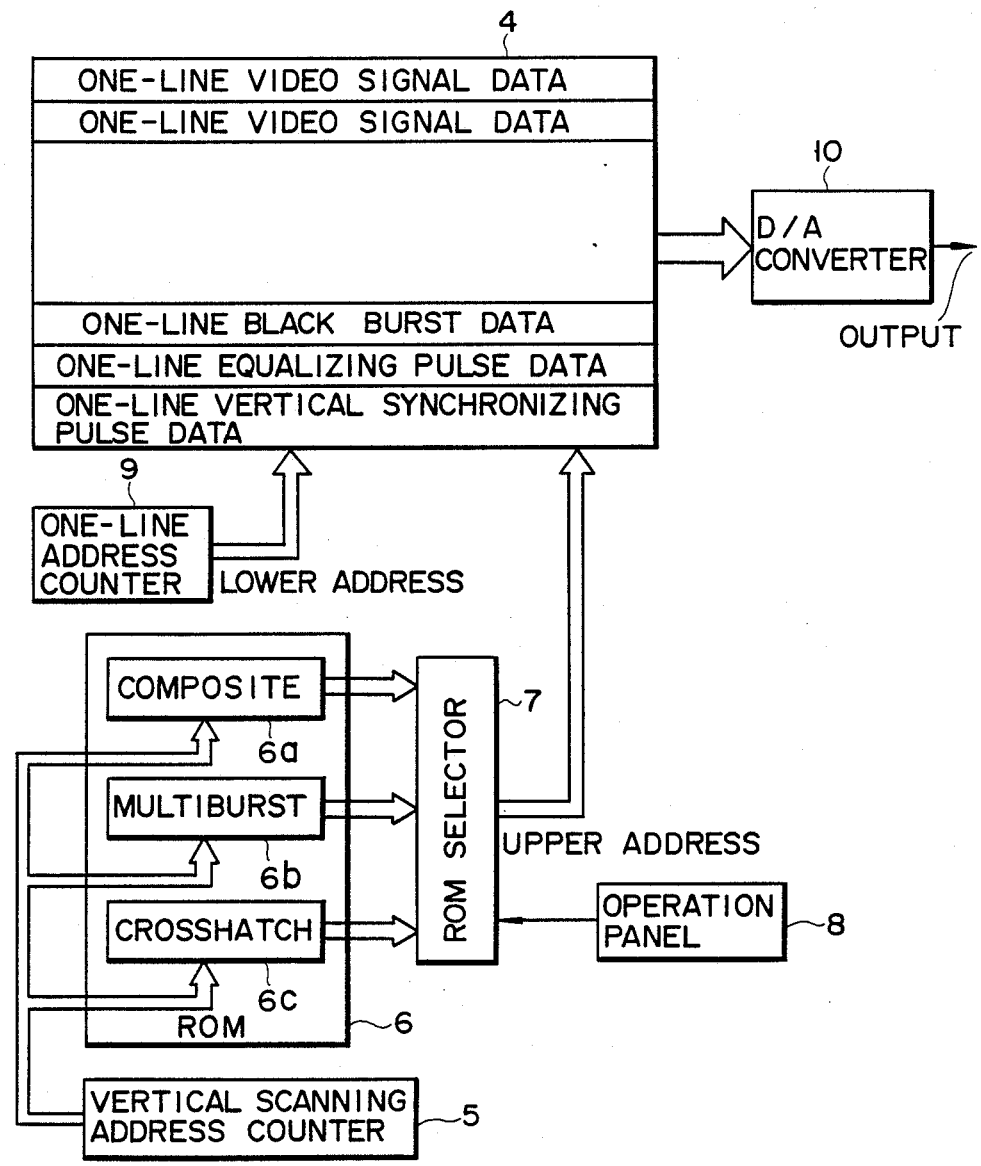
FIG. 22 is a block diagram showing a schematic arrangement of a conventional television signal generator.

For example, when field one line composite television testing signal 11 shown in FIG. 3 is to be obtained, a capacity of 3640 words is required in the conventional apparatus shown in FIG. 22, as described above. In the apparatus according to the embodiment, since the components of luminance signal 12 can be represented by the polynomial of 12 functions as shown in FIG. 4, a capacity of (9 words × 12) is required for luminance signal 12. Similarly, since the components of chrominance and sync signals 13 and 14 can be respectively represented by the polynomials of 5 and 4 functions, capacities of (6 words × 5) and (9 words × 4) are required for these signals. Thus, a total capacity of 174 is required, and the storage capacity can be greatly decreased.

Table 3 compares the storage capacities required in the conventional apparatus and that required in the embodiment when N types of television testing signals are to be output. In this comparison, the field-blanking period is omitted. As is apparent from Table 3, it is found that the storage capacity can be greatly decreased within a applicable range.

TABLE 3

| N | Prior Art<br>N × 3.64 KW | Embodiment<br>N × 0.174 KW + 3.6 KW × 3(Y,C,SYNC) |
|---|---|---|
| 1 | 3.64 KW | 11.094 KW |
| 10 | 36.4 KW | 12.66 KW |
| 30 | 109.2 KW | 16.14 KW |
| 100 | 364 KW | 28.32 KW |

→ Practical range

Furthermore, since the maximum magnitude values of luminance, chrominance, and sync signal 12, 13, and 14 can be respectively expressed by 10 bits, the amplitude linearity and the phase linearity of television testing signal 11 obtained by mixing these signals are greatly improved as compared with those of the conventional case wherein the magnitude value of a final television testing signal is set to be 10 bit. Especially, as shown in the embodiment in FIG. 1, if the digital signal waveforms output from respective component data memories 25, 26, and 27 are converted into analog waveforms by D/A converters 31, 32, and 33, and then mixed together by waveform mixer 34 into one television testing signal 11, the amplitude linearity and the phase linearity can be further improved.

Figure 13A:
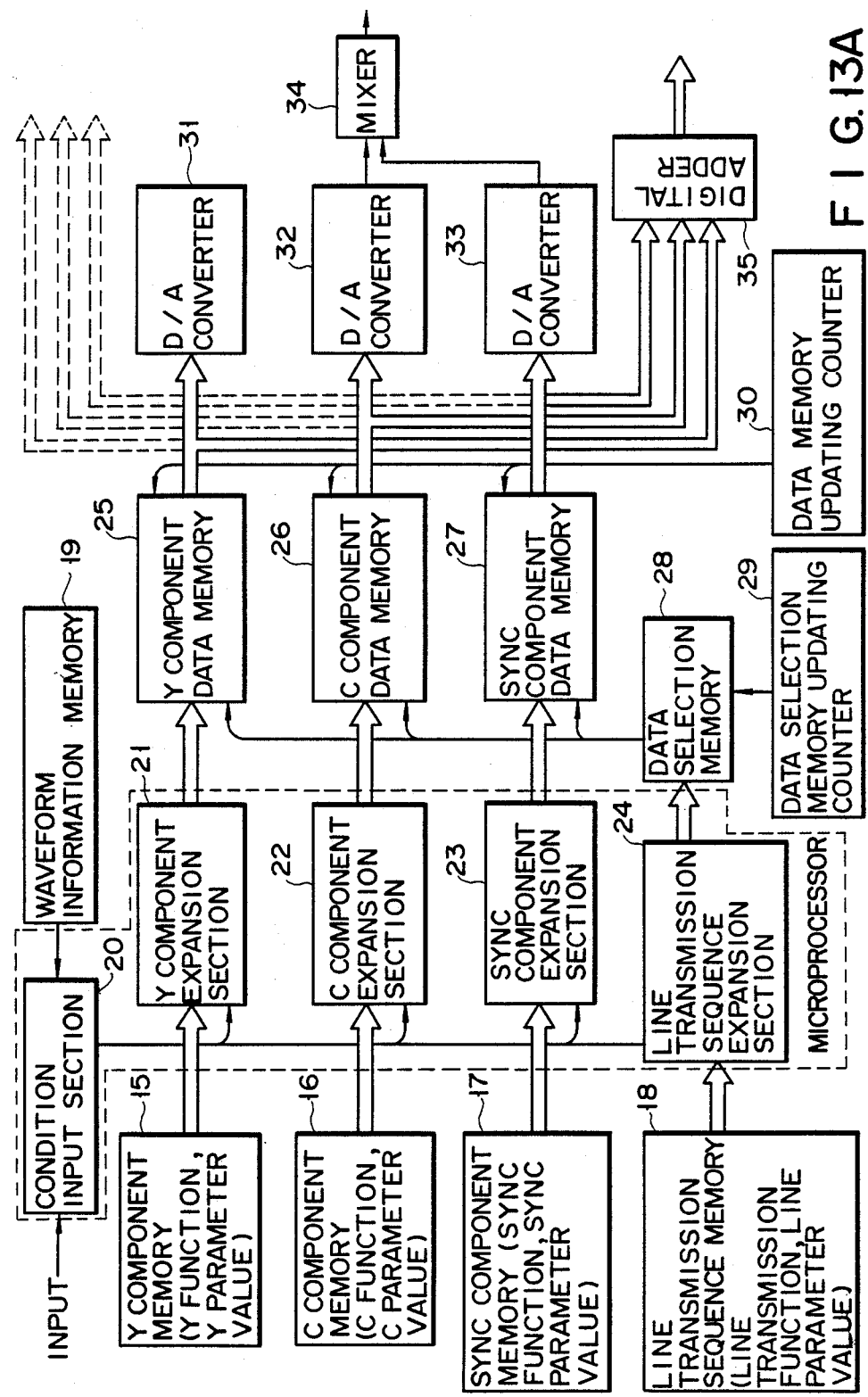

Note that the present invention is not limited to the above-described embodiment. As shown in FIG. 13A, the digital magnitude values (data values) corresponding to the signal waveforms output from luminance, chrominance, and sync component data memories 25, 26 and 27 may be added to one another for every time base position x using digital adder 35 serving as a waveform mixer, and a digital television testing signal may be output.

By transmitting digital television testing signals as well as analog signals, an A/D converter for supplying a standard television testing signal can be omitted in the case where the units to be tested are analyzed by a computer.

The digital output signals of the Y, C, and SYNC components may be output separately before they are to be supplied to D/A converters 31 to 33 and digital adder 35, as shown by broken lines in FIG. 13A.

Figure 13B:
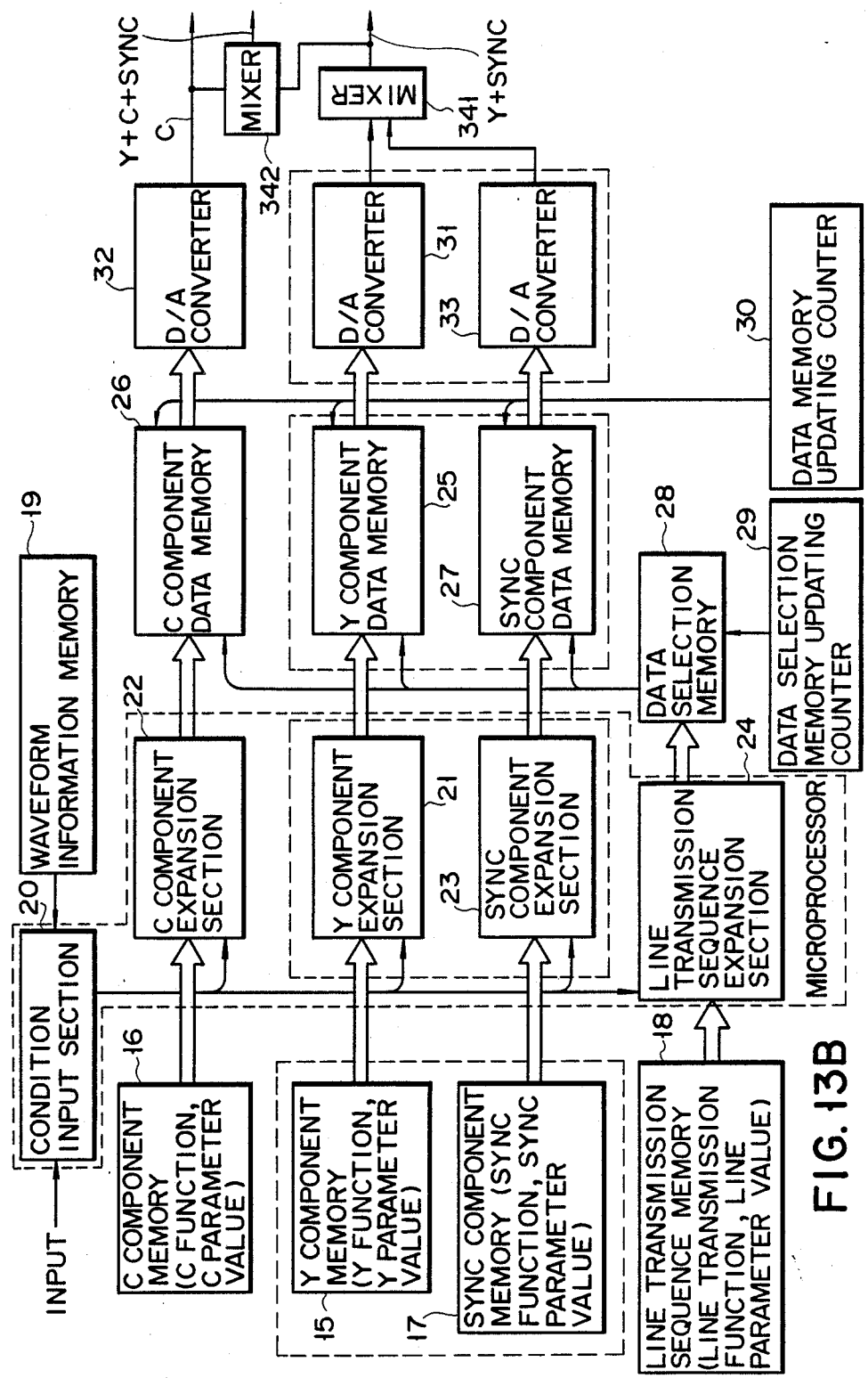

Furthermore, in order to adapt the apparatus to Y/C separation TV systems, the Y and SYNC components are mixed by first mixer 341 and the Y+SYNC output from first mixer 341 and the C component are mixed by second mixer 342, as shown in FIG. 13B. In this case, a composite signal including the Y+C+SYNC component and a signal including the Y+SYNC component are respectively output from second and first mixers 342 and 341. In addition, a signal is output which only includes the C component which is separated from the other signals output. Therefore, when the apparatus is used as a Y/C separation system, a user need only select the signal which includes the Y+SYNC signal or the signal which only includes the C component.

According to the above description, the Y and SYNC components are respectively processed by independent circuit systems. However, as indicated by the frames of broken lines in FIG. 13B, both the signals may be integrally processed.

FIG. 14 is a block diagram showing a schematic arrangement of a television signal generator according to another embodiment of the present invention. The same reference numerals in FIG. 14 denote the same parts as in FIG. 1.

In this embodiment, function parameter input section 36 is added thereto. When the functions and their parameter values constituting polynomials are externally input to function parameter input section 36 through an operation panel or the like, function parameter input section 36 forms designated functions and their parameter values to be set in luminance and chrominance component memories 15 and 16. In this case, luminance and chrominance component memories 15 and 16 are respectively constituted by programmable RAM elements.

After the functions and their parameter values have been set in luminance and chrominance component memories 15 and 16 using function parameter input section 36, a waveform number is input to condition input section 20 by a conventional means described above, thereby obtaining a television testing signal corresponding to the newly set functions and their respective parameter values.

Accordingly, the user of this television signal generator can arbitrarily form and change the television testing signals to be output. Therefore, an easy-to-use television signal apparatus which can adapt itself to various objects and has a wide application range can be realized.

In addition, since signal waveforms can be arbitrarily set, the storage capacity can be further decreased by limiting signal waveform number N of the television testing signals preset in the respective component memories 15, 16, and 17 to a minimum value.

Figure 15:
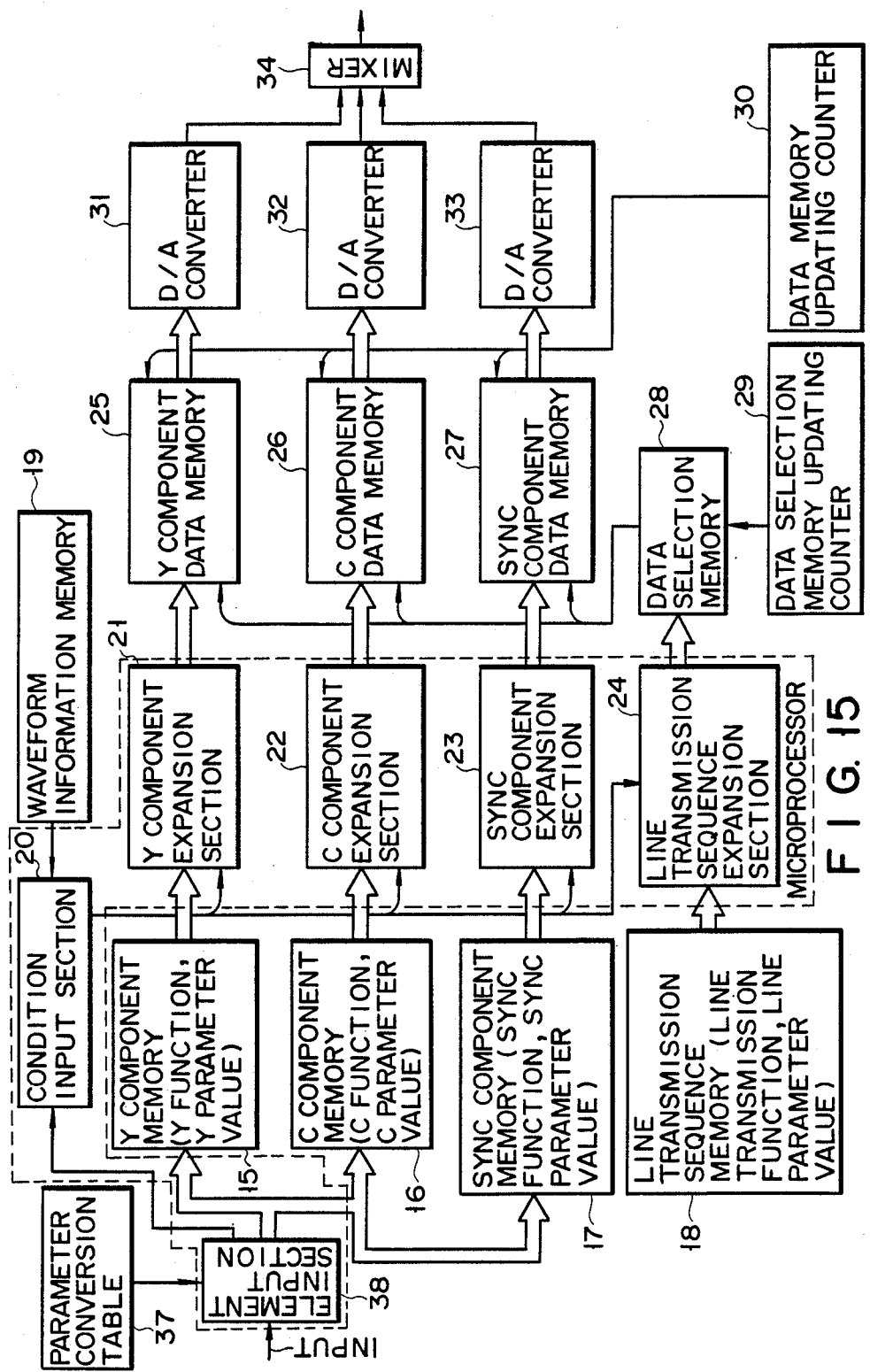

FIG. 15 is a block diagram showing a schematic arrangement of a television signal generator according to still another embodiment of the present invention. The same reference numerals in FIG. 15 denote the same parts as in FIG. 1.

In this embodiment, parameter conversion table 37 constituted by a storage element such as a RAM and element input section 38 shown in the program processing sequence of the microprocessor are added thereto.

Figure 16:
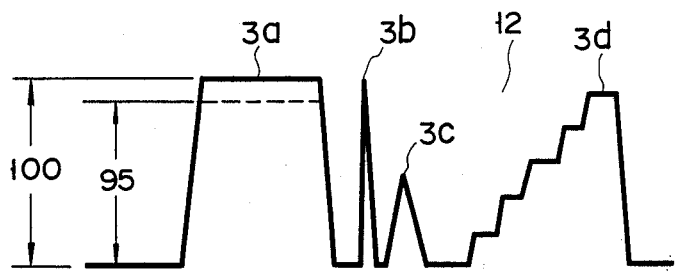
FIG. 16 is a timing chart for explaining an operation of the apparatus according to the embodiment in FIG. 15.

Parameter conversion equations are stored in parameter conversion table 37. When the level values of elements 3a to 3d of a television testing signal are arbitrarily set as shown in FIG. 16, the parameter conversion equations are used to obtain parameter values for setting the level values to be the set values. As shown in FIG. 6, waveform information memory 19 stores number ln of level values to be changed, which is set in parameter conversion table 37, storage pointer lp, and storage pointer lp of the parameter conversion equations for every waveform number.

Figure 17:
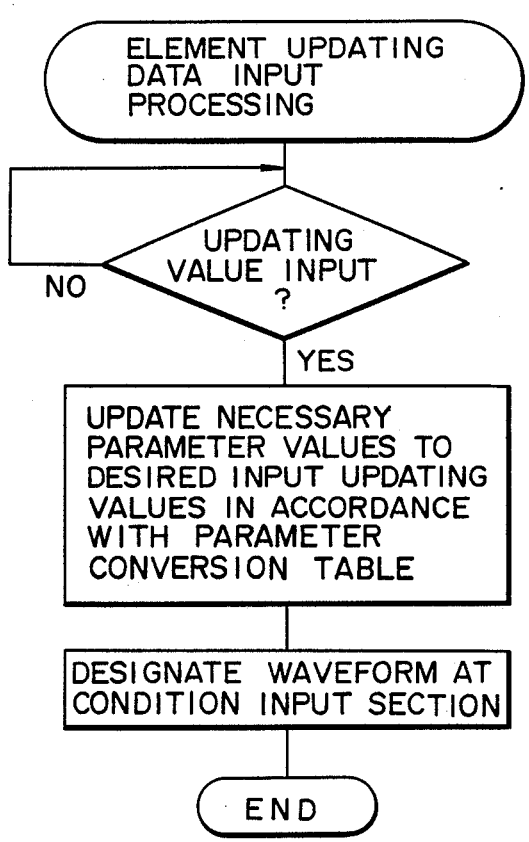
FIG. 17 is a flow chart showing an operation of the apparatus according to the embodiment In FIG. 15.

Element input section 38 is programmed so as to execute the processing shown in the flow chart of FIG. 17. More specifically, when information specifying a waveform number and elements is externally supplied together with values of element levels to be changed (set values), element input section 38 calculates corresponding parameter values using the corresponding parameter conversion equations in parameter conversion table 37. Then, the parameter values of the corresponding waveform number in luminance, chrominance, and sync component memories 15, 16, and 17 are rewritten into the calculated parameter values. Subsequently, the corresponding waveform number is transmitted to condition input section 20.

Condition input section 20 reads out the waveform information of the waveform number supplied by element input section 38 from waveform information memory 19 and starts television testing signal generation processing.

According to the television signal generator with the above-described arrangement, when, for example, the element level of first element 3a constituting a television testing signal is to be changed from 100 IRE to 95 IRE as shown in FIG. 16, the level can be changed to 95 IRE indicated by the broken line by only supplying information for designating the waveform number and first element 3a, together with a number of [95]. Therefore, in order to change an element level, it is not required to calculate a large number of parameter values and supply the resultant values as parameter values to be changed. That is, an element level can be arbitrarily set with a simple operation and hence operability can be greatly improved.

Figure 18:
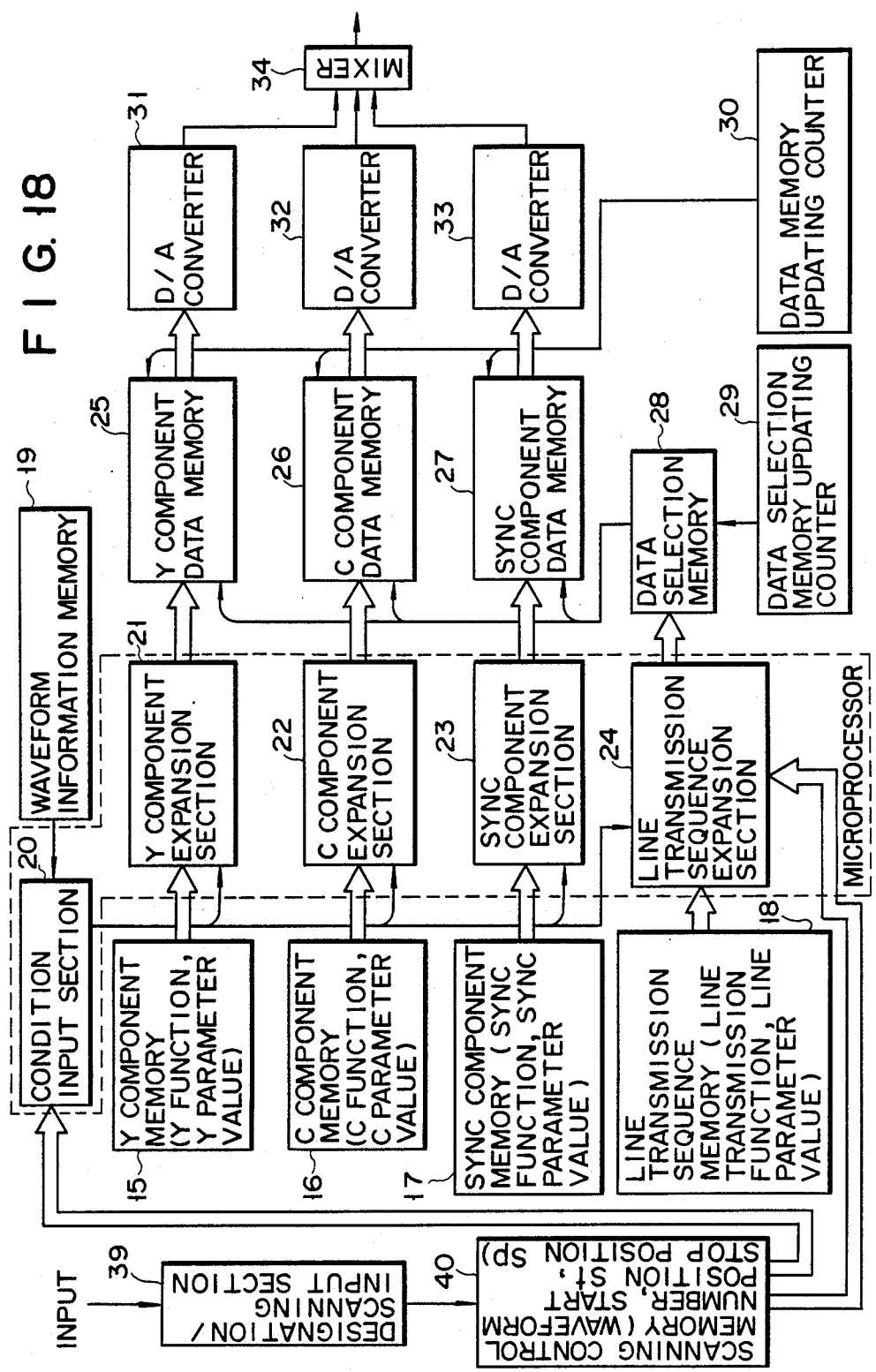

FIG. 18 is a block diagram showing a schematic arrangement of a television signal generator according to still another embodiment of the present invention. The same reference numerals in FIG. 18 denote the same parts as in FIG. 1.

In this embodiment, designation/scanning input section 39 for designating each line and a television testing signal to be output thereto, and scanning control memory 40 serving as a transmission sequence control section are added.

Figure 5:
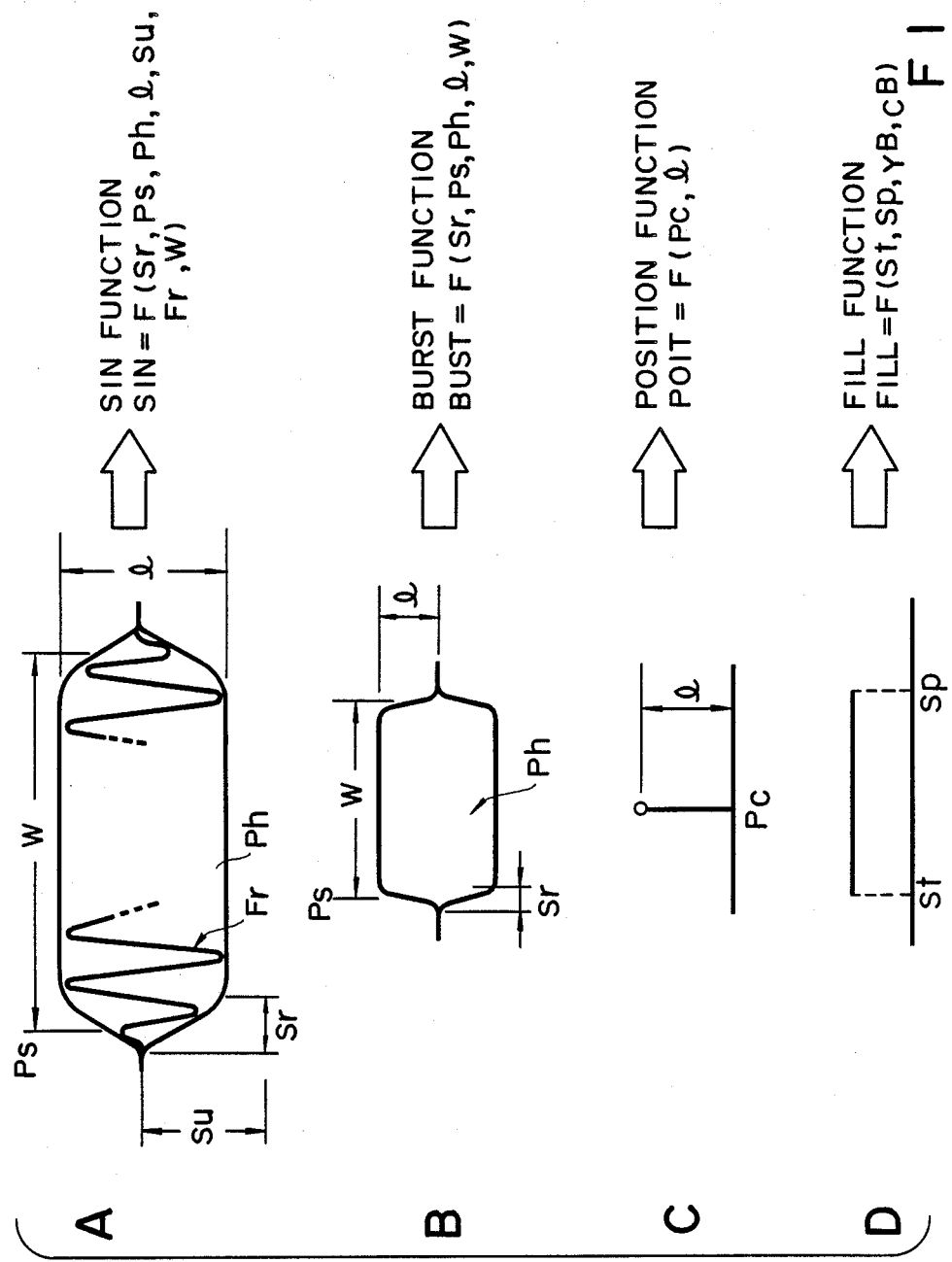

When a waveform number to be scanned, and start and stop positions St and Sp as parameter values of the fill function (FILL) shown in FIG. 5, which represents the output duration of the corresponding waveform are externally input to designation/scanning input section 39 through an operation panel or the like, it stores them in scanning control memory 40 constituted by a RAM or the like. In addition, designation/scanning input section 39 supplies the waveform number stored in scanning control memory 40 to condition input section 20 and also supplies the output duration information constituted by start and stop positions St and Sp to line transmission sequence expansion section 24.

In response to the waveform number from scanning control memory 40, condition input section 20 executes television testing signal generation processing in accordance with the flow charts shown in FIGS. 7 to 12 described above.

Figure 19:
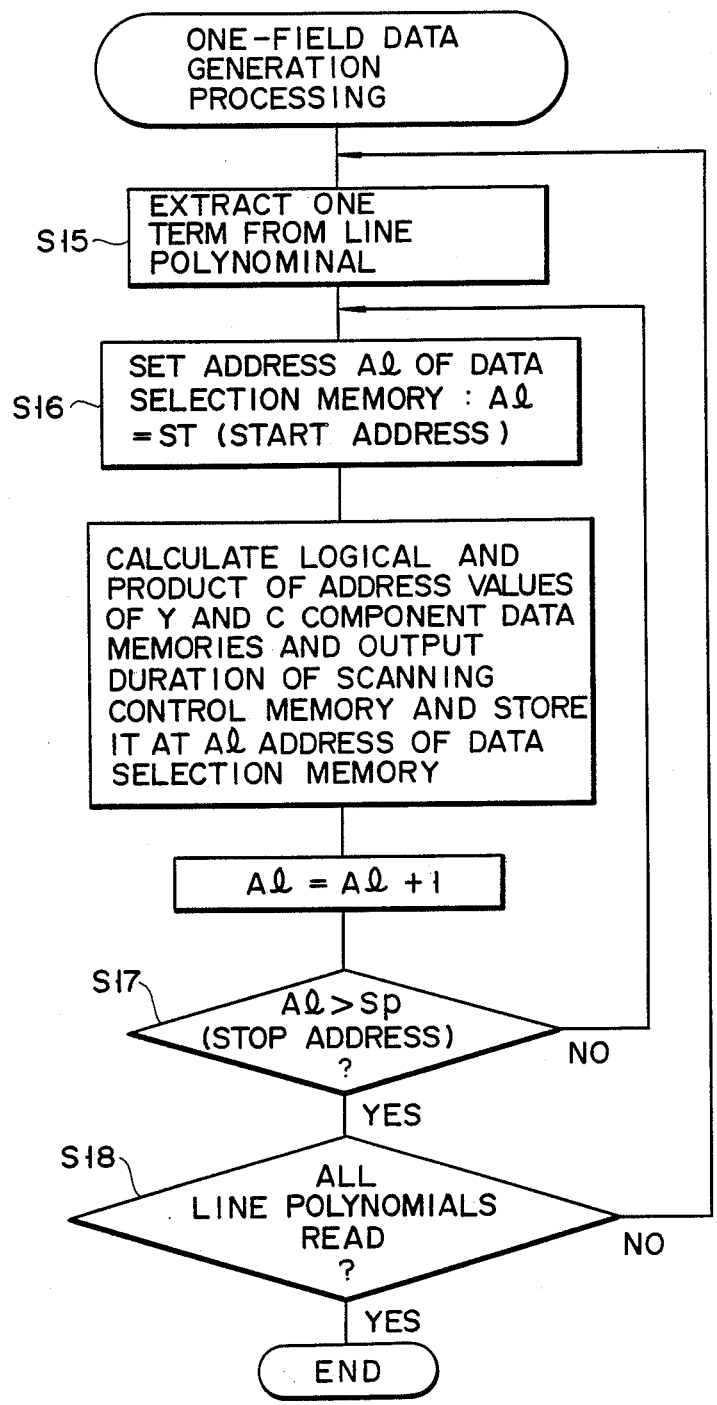
FIG. 19 is a flow chart showing an operation of the apparatus according to the embodiment in FIG. 18.
Figure 20:
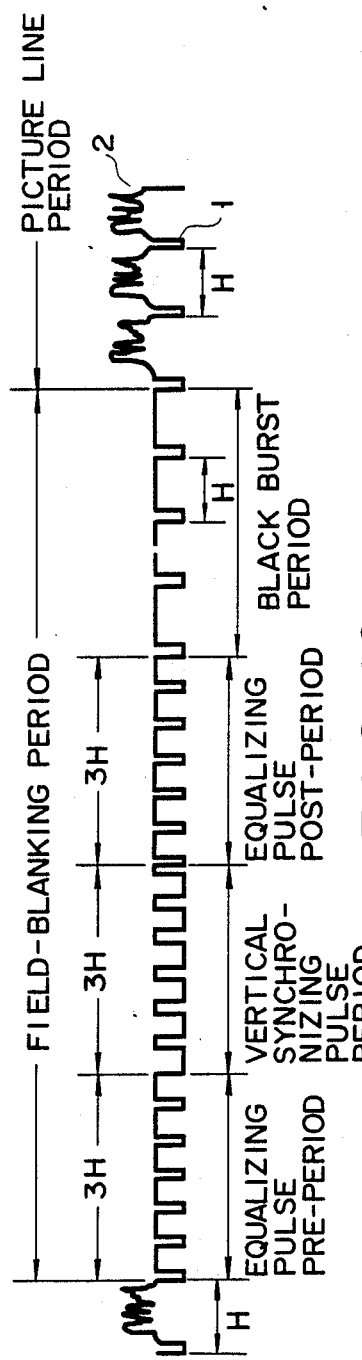
FIGS. 20 and 21 are timing charts showing a general television testing signal.
Figure 21:
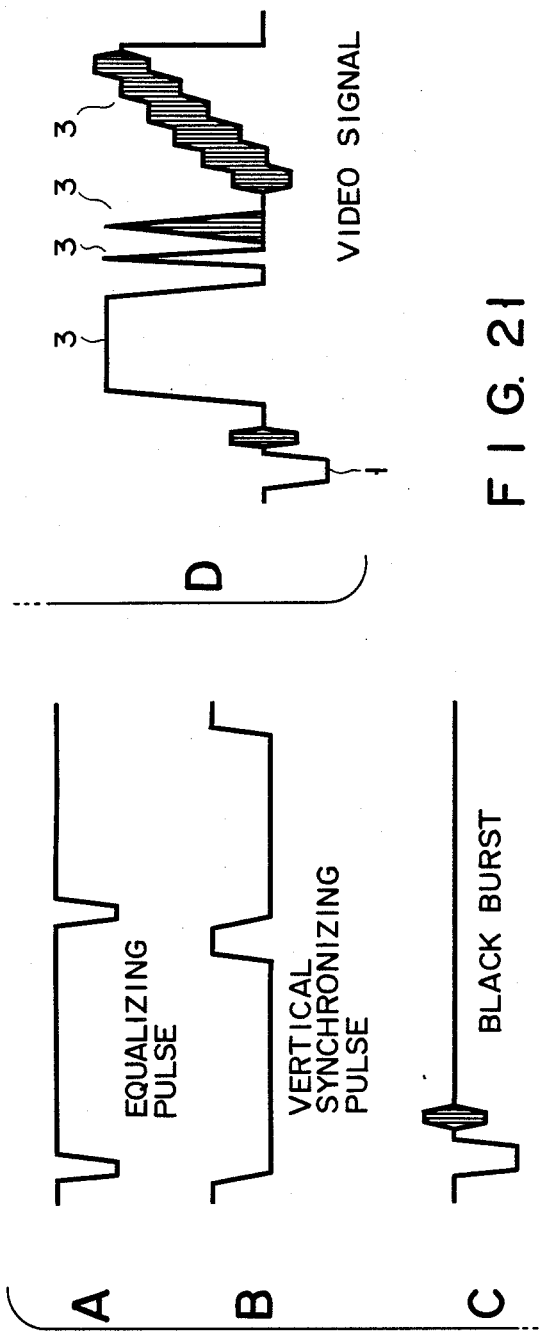

In this embodiment, the one-field line data generation processing shown in FIG. 19 is executed in place of that shown in FIG. 12. In the flow chart of FIG. 19, each processing in steps S15, S16, S17, and S18 is performed in the same manner as in FIG. 12.

After address Al of data selection memory 28 is set to start position St in step S16, the logical AND product of the storage address values of luminance and chrominance component data memories 25 and 26 and the output duration supplied from scanning control memory 40 is calculated. Then, the storage address are stored at the Al address of data selection data memory 28 only when they are included in the output duration. The address Al is increased by one. With this processing, only the respective magnitude values of the luminance and chrominance signals in the designated output duration can be supplied to corresponding D/A converters 31 and 32 through luminance and chrominance component data memories 25 and 26. As a result, television testing signal 11 in the designated duration is output from waveform mixer 34.

According to the television signal generator with the above-described arrangement, if the waveform number of a television testing signal waveform to be output and the output duration (start position St, stop position Sp) for which the waveform is to be output are input, the designated waveform is output for the designated duration. Therefore, a specific signal can be arbitrarily assigned to a specific line on a TV screen, thereby further improving operability for the user.

For example, resolution of the vertical axis direction of a TV screen can be more easily evaluated.

As has been described above, according to the television signal generator of the present invention, a television testing signal is decomposed into a plurality of signal waveforms including Y, C and sync, and a plurality of parameters in the form of functions and parameters representing the signal waveforms are stored. Therefore, even if the number of television testing signals is increased, the storage capacity is not greatly increased, and hence the manufacturing cost of the overall apparatus can be reduced. In addition, the amplitude and phase linearities of a generated television testing signal can be improved, thereby obtaining a high-precision television testing signal.

According to the most conspicuous characteristic of the present invention, various television testing signals can be arbitrarily formed and changed by entering functions and their parameter values. Therefore, the application range of the apparatus can be greatly widened so that excellent multi-functionality can be achieved.

Furthermore, when the element level value of a signal waveform is to be changed, the element level value of an output signal waveform is automatically changed by directly inputting the element level value. Therefore, operability can be greatly improved.

Moreover, since a specific signal waveform can be arbitrarily assigned to a specific line, the application range of the apparatus can be further widened.

What is claimed is:

1. An apparatus for generating television testing signals including luminance signals, chrominance signals, and sync signals which combine to form composite testing signals, the apparatus comprising:

first memory means for storing a plurality of first functions corresponding to a first polynomial representing at least a one-line waveform of a luminance signal to be included in a television testing signal, and for storing first parameter values for defining said first functions;

second memory means for storing a plurality of second functions corresponding to a second polynomial representing at least a one-line waveform of a chrominance signal to be included in the television testing signal, and for storing second parameter values for defining said second functions;

third memory means for storing a plurality of third functions corresponding to a third polynomial representing at least a one-line waveform of a sync signal to be included in the television testing signal, and for storing third parameter values for defining said third functions;

waveform data memory means for storing a plurality of waveform data items representing said first, said second, and said third polynomials, said first, said second, and said third functions, and said first, said second, and said third parameter values wherein said waveform data items define a waveform of a television testing signal to be output by the apparatus;

condition input means for reading from said waveform data memory means those waveform data items corresponding to a waveform number that designates the waveform of a desired output television testing signal, when the waveform number is input, and for reading out from said first, said second, and said third memory means certain ones of said polynomials and said parameter values relating to said luminance signal, said chrominance signal, and said sync signal, wherein said certain polynomials and parameter values correspond to the waveform data items read from said waveform data memory means;

first expansion means for calculating magnitude values for positions along a time axis for said at least one-line waveform of said luminance signal according to said first polynomial after said condition input means reads said first functions and said first parameters from said first memory means;

second expansion means for calculating magnitude values for positions along said time axis for said at least one-line waveform of said chrominance signal according to said second polynomial after said condition input means reads said second functions and said second parameters from said second memory means;

third expansion means for calculating magnitude values for positions along said time axis for said at least one-line waveform of said sync signal according to said third polynomial after said condition input means reads said third functions and said third parameters from said third memory means;

fourth memory means for storing the calculated magnitude values of the positions along the time axis for said at least one-line waveform of the luminance signal;

fifth memory means for storing the calculated magnitude values of the positions along the time axis for said at least one-line waveform of the chrominance signal;

sixth memory means for storing the calculated magnitude values of the positions along the time axis for said at least one-line waveform of the sync signal;

line transmission sequence memory means for storing a line transmission sequence function for determining a sequence of transmission of the calculated magnitude values associated with said at least one-line waveforms of the luminance signal, the chrominance signal, and the sync signal as stored in said fourth memory means, said fifth memory means, and said sixth memory means, respectively, and for storing a plurality of line sequence parameter values for defining said line transmission sequence function;

line transmission sequence expansion means for reading said line transmission sequence function and the line sequence parameter values defining the function from said line transmission sequence memory means in accordance with the waveform data items read from said waveform data memory means by said condition input means, and for calculating data representing a sequence of transmitting one-line data items;

data selecting means for reading from said fourth memory means, said fifth memory means, and said sixth memory means, the calculated magnitude values associated with the luminance signal, the chrominance signal, and the sync signal, in the form of one-line data items in accordance with said sequence represented by the data calculated by said line transmission sequence expansion means; and output means for mixing said one-line data items for each line of a television testing signal to be generated, said data items relating to the luminance signal, the chrominance signal, and the sync signal as read from said fourth, said fifth and said sixth memory means by said data selecting means, including means for forming mixed one-line data of a predetermined format, and for outputting the mixed one-line data.

2. An apparatus according to claim 1, wherein said mixed one-line data forming means of said output means includes means for performing, in a specific manner, digital addition of the one-line data items for each line of the television testing signal to be generated, the data items relating to the luminance signal, the chrominance signal, and the sync signal as read in a determined sequence from said fourth memory means, said fifth memory means, and said sixth memory means, respectively.

3. An apparatus according to claim 1, comprising function/parameter input means coupled to at least one of said first and said second memory means for changing each function and each parameter value, in response to a function/parameter changing signal.

4. An apparatus according to claim 1, comprising parameter conversion table means for storing conversion formulae for obtaining parameter values corresponding to waveform elements included in a waveform of a television testing signal to be generated; and waveform element input means for calculating a parameter value corresponding to an element value input with a waveform number for identifying the waveform of the television testing signal to be generated and data specifying a waveform element, in accordance with the conversion formulae stored in said parameter conversion table means and specified by the data specifying the waveform element, said waveform element input means being coupled to at least one of said first to third memory means for changing the parameter value thus calculated.

5. An apparatus according to claim 1, comprising:
scanning data input means for inputting a waveform number for specifying a waveform of one of the television testing signals to be generated and which is to be scanned, and period data representing a period during which the specified testing signal is to be generated; and scanning control data memory means for storing the waveform number and the period data as input by said scanning data input means, and for supplying the waveform number and the period data to said condition input means and said line transmission sequence expansion means;

wherein said data selecting means outputs a signal waveform corresponding to a specified waveform number, for a period of time specified by said period data.

6. An apparatus according to claim 1, wherein said output means includes means for outputting each one-line data item in the form of digital data.

7. An apparatus according to claim 1, wherein said output means comprises:
first, second and third digital-to-analog (D/A) converting means for converting into analog signals said one-line data items for each line of the television testing signal to be generated, the data items relating to the luminance signal, the chrominance signal, and the sync signal as read in a determined sequence from said fourth memory means, said fifth memory means, and said sixth memory means, respectively; and mixing means for mixing the outputs from said first, said second, and said third D/A converting means.

8. An apparatus according to claim 7, wherein said mixing means comprises:
first mixing means for mixing the one-line data items output from said first D/A converting means and said third D/A converting means, and for producing mixed data; and second mixing means for mixing the mixed data produced by said first mixing means and the one-line data items output from said second D/A converting means;

wherein said mixing means outputs two waveform data items separately, which items correspond substantially to the chrominance signal and the luminance signal, respectively.

9. An apparatus according to claim 7, wherein said first to third memory means, said first to third expansion means, said fourth to sixth memory means, and said first to third D/A converting means, are adapted to process and luminance signal and said sync signal in an integral fashion.

* * * * *